(12) United States Patent
Fukutaka et al.

(10) Patent No.: US 11,318,879 B2
(45) Date of Patent: May 3, 2022

(54) IRRADIATION APPARATUS AND IRRADIATION METHOD

(71) Applicant: Mitsubishi Electric Corporation, Tokyo (JP)

(72) Inventors: Shinsaku Fukutaka, Tokyo (JP); Akiko Imaishi, Tokyo (JP); Munetaka Nishihira, Tokyo (JP); Tsutomu Matsubara, Tokyo (JP); Kei Kasuga, Tokyo (JP); Reiko Sakata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 324 days.

(21) Appl. No.: 16/639,069

(22) PCT Filed: Sep. 15, 2017

(86) PCT No.: PCT/JP2017/033539
§ 371 (c)(1),
(2) Date: Feb. 13, 2020

(87) PCT Pub. No.: WO2019/053890
PCT Pub. Date: Mar. 21, 2019

(65) Prior Publication Data
US 2021/0188159 A1 Jun. 24, 2021

(51) Int. Cl.
*B60Q 1/50* (2006.01)
*B60Q 1/46* (2006.01)
(Continued)

(52) U.S. Cl.
CPC .............. *B60Q 1/46* (2013.01); *B60Q 1/22* (2013.01); *G02B 27/0101* (2013.01);
(Continued)

(58) Field of Classification Search
CPC ........ B60Q 1/46; B60Q 1/22; B60Q 2400/50; B60Q 9/008; B60Q 2400/40; B60Q 1/50;
(Continued)

(56) References Cited

U.S. PATENT DOCUMENTS

| 2014/0062685 A1* | 3/2014 | Tamatsu | B60Q 5/005 340/425.5 |
|---|---|---|---|
| 2015/0127222 A1* | 5/2015 | Cunningham, III | B60Q 5/006 701/41 |

(Continued)

FOREIGN PATENT DOCUMENTS

| JP | 62-189250 U | 12/1987 |
| JP | 8-216780 A | 8/1996 |

(Continued)

OTHER PUBLICATIONS

International Search Report dated Nov. 28, 2017 in PCT/JP2017/033539 filed Sep. 15, 2017.
(Continued)

*Primary Examiner* — Munear T Akki
(74) *Attorney, Agent, or Firm* — Birch, Stewart, Kolasch & Birch, LLP

(57) ABSTRACT

When information regarding a situation inside and outside a vehicle is determined to match a display change condition, a control unit (32) changes a display mode of information displayed outside the vehicle by controlling a projector device (4a) or a body light device (4b).

20 Claims, 17 Drawing Sheets

(51) Int. Cl.
    *B60Q 1/22*     (2006.01)
    *G02B 27/01*    (2006.01)
(52) U.S. Cl.
    CPC .. *G02B 27/0179* (2013.01); *B60K 2370/1868* (2019.05); *B60K 2370/334* (2019.05); *B60Q 2400/50* (2013.01); *G02B 2027/014* (2013.01); *G02B 2027/0183* (2013.01)
(58) Field of Classification Search
    CPC ............ G02B 27/0101; G02B 27/0179; G02B 2027/014; G02B 2027/0183; B60K 2370/1868; B60K 2370/334; B60K 2370/1876; B60K 2370/797; B60K 35/00
    See application file for complete search history.

(56) References Cited

U.S. PATENT DOCUMENTS

| | | | | |
|---|---|---|---|---|
| 2015/0336502 | A1* | 11/2015 | Hillis | B60Q 1/26 701/23 |
| 2016/0297357 | A1 | 10/2016 | Hayakawa et al. | |
| 2017/0106793 | A1* | 4/2017 | Kumar | B60Q 1/0023 |
| 2017/0203685 | A1 | 7/2017 | Hirai et al. | |
| 2017/0240098 | A1* | 8/2017 | Sweeney | B60Q 1/2615 |
| 2017/0253177 | A1* | 9/2017 | Kawamata | B60K 35/00 |
| 2018/0004020 | A1 | 1/2018 | Kunii et al. | |
| 2018/0174460 | A1* | 6/2018 | Jung | B60Q 5/006 |
| 2018/0257548 | A1* | 9/2018 | Suzuki | B60Q 1/525 |
| 2018/0319325 | A1* | 11/2018 | Tatara | B60Q 1/442 |

FOREIGN PATENT DOCUMENTS

| | | |
|---|---|---|
| JP | 3102294 U | 7/2004 |
| JP | 2008-7079 A | 1/2008 |
| JP | 2014-46838 A | 3/2014 |
| JP | 2014-144725 A | 8/2014 |
| JP | 2015-209154 A | 11/2015 |
| JP | 2016-199072 A | 12/2016 |
| JP | 2017-19419 A | 1/2017 |
| WO | WO 2016/027315 A1 | 2/2016 |
| WO | WO 2016/114048 A1 | 7/2016 |

OTHER PUBLICATIONS

Japanese Office Action dated Jun. 5, 2018 in Japanese Patent Application No. 2018-518537.
Japanese Office Action dated Oct. 30, 2018 in Japanese Patent Application No. 2018-518537.
Indian Office Action for Indian Application No. 202047007673, dated Dec. 16, 2020, with English translation.

* cited by examiner

FIG. 6A
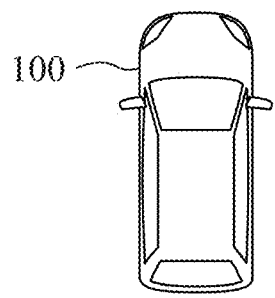
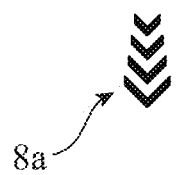
FIG. 6B
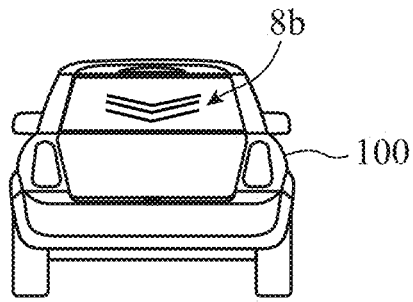
FIG. 7
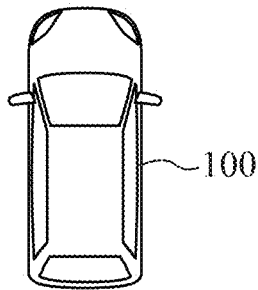
FIG. 8A
FIG. 8B
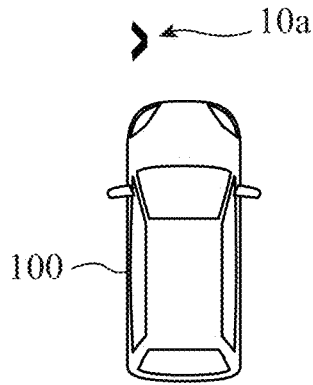
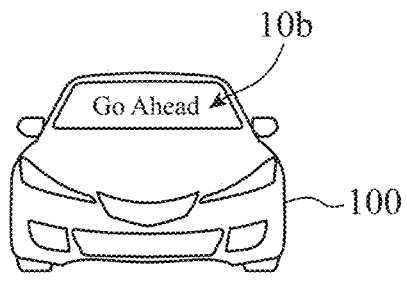

IRRADIATION APPARATUS AND IRRADIATION METHOD

TECHNICAL FIELD

The present invention relates to an irradiation apparatus and an irradiation method for displaying information outside a vehicle by light irradiation.

BACKGROUND ART

Conventionally, a technique of displaying information outside a vehicle by irradiating a road surface with light is known. For example, in a vehicle information display apparatus described in Patent Literature 1, a display pattern corresponding to vehicle information regarding the state of a vehicle is projected onto a road surface using an illumination lamp or a sign lamp disposed in the vehicle.

CITATION LIST

Patent Literatures

Patent Literature 1: JP 2014-144725 A

SUMMARY OF INVENTION

Technical Problem

In the vehicle information display apparatus described in Patent Literature 1, at the timing when it is recognized that a vehicle is in a certain state, a display pattern representing the vehicle state at this time is displayed outside the vehicle.

However, since the actual situation inside and outside the vehicle changes from moment to moment, there is a problem that, even if information is displayed outside the vehicle on the basis only of the vehicle state, information displayed outside the vehicle cannot be accurately transmitted to a target person outside the vehicle in some situations inside and outside the vehicle.

The present invention solves the above problem, and an object of the present invention is to obtain an irradiation apparatus and an irradiation method which can accurately inform a target person outside a vehicle of information displayed outside the vehicle.

Solution to Problem

An irradiation apparatus according to the present invention includes one or more irradiation units, an information acquisition unit, a determination unit, and a control unit. The irradiation unit emits light and displays information outside a vehicle. The information acquisition unit acquires information regarding the situation inside and outside the vehicle. The determination unit determines whether or not the information regarding the situation outside the vehicle acquired by the information acquisition unit meets a display start condition. The control unit displays, outside the vehicle, information corresponding to the display start condition determined by the determination unit to meet the information regarding the situation outside the vehicle by controlling the one or more irradiation units.

In this configuration, after display of the information outside the vehicle, the determination unit determines whether or not the information regarding the situation inside and outside the vehicle acquired by the information acquisition unit meets a display change condition. When the determination unit determines that the information regarding the situation inside and outside the vehicle meets the display change condition, the control unit controls the one or more irradiation units and changes a display mode of each of pieces of the information displayed outside the vehicle,
comprising a first out-of-vehicle sensor that is a sensor detecting an object around the vehicle; and
a second out-of-vehicle sensor that is a sensor detecting an object around the vehicle and is disposed at a position different from the first out-of-vehicle sensor,
wherein the information acquisition unit obtains detection information of the first out-of-vehicle sensor and the second out-of-vehicle sensor, and
the determination unit determines at least one of matching between the detection information and the display start condition, and matching between the detection information and the display change condition on the basis of detection information of the first out-of-vehicle sensor and detection information of the second out-of-vehicle sensor.

Advantageous Effects of Invention

According to the present invention, when the information regarding the situation inside and outside the vehicle meets the display change condition, the display mode of the information displayed outside the vehicle is changed, and therefore a target person outside the vehicle can be accurately informed of the information displayed outside the vehicle.

BRIEF DESCRIPTION OF DRAWINGS

FIG. 6A is a diagram illustrating an example of display information for notifying a person outside a vehicle of a vehicle state where the vehicle is about to move backward.

FIG. 6B is a diagram illustrating another example of display information for notifying a person outside a vehicle of a vehicle state where the vehicle is about to move backward.

FIG. 7 is a diagram illustrating an example of display information for notifying a person outside a vehicle of a vehicle state where the vehicle is about to turn left.

FIG. 8A is a diagram illustrating an example of display information for notifying a person outside a vehicle of a vehicle state where crossing in front of the vehicle is permitted.

FIG. 8B is a diagram illustrating another example of display information for notifying a person outside a vehicle of a vehicle state where crossing in front of the vehicle is permitted.

DESCRIPTION OF EMBODIMENTS

Hereinafter, in order to describe the present invention in more detail, embodiments for carrying out the present invention will be described with reference to the attached drawings.

First Embodiment

Figure 1:
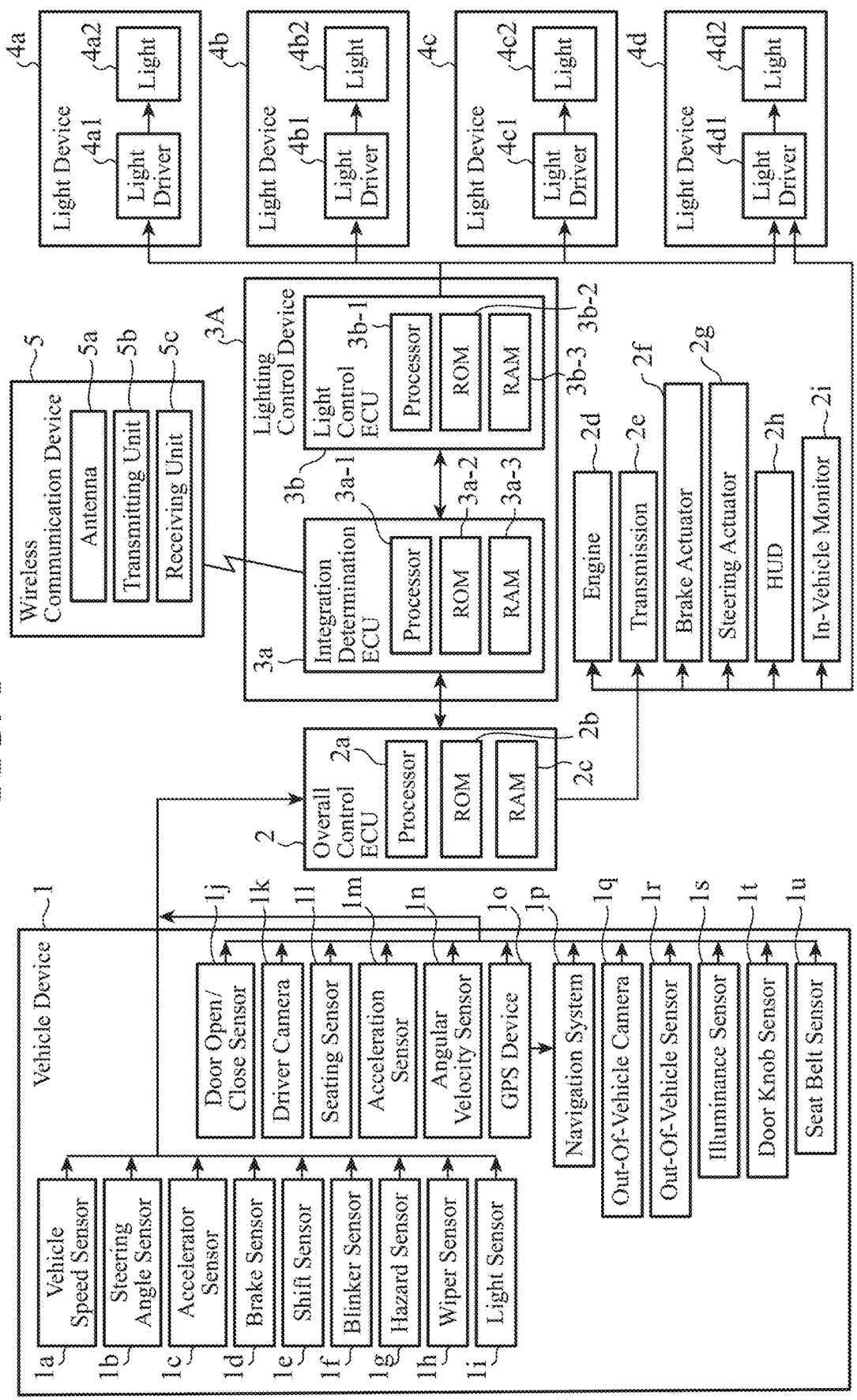
FIG. 1 is a block diagram illustrating a hardware configuration in a first embodiment of the present invention.

FIG. 1 is a block diagram illustrating a hardware configuration in a first embodiment of the present invention. A vehicle in the first embodiment includes a vehicle device 1 serving as various sensors and an in-vehicle device. An overall control electronic control unit (ECU) 2 can control hardware of a control target on the basis of information acquired by the vehicle device 1. The vehicle device 1 includes a vehicle speed sensor 1a, a steering angle sensor 1b, an accelerator sensor 1c, a brake sensor 1d, a shift sensor 1e, a blinker sensor 1f, a hazard sensor 1g, a wiper sensor 1h, a light sensor 1i, a door open/close sensor 1j, a driver camera 1k, a seating sensor 1l, an acceleration sensor 1m, an angular velocity sensor 1n, a GPS device 1o, a navigation system 1p, an out-of-vehicle camera 1q, an out-of-vehicle sensor 1r, an illuminance sensor 1s, a door knob sensor 1t, and a seat belt sensor 1u.

The overall control ECU 2 outputs information received via a controller area network (CAN) to a lighting control device 3A. The lighting control device 3A controls each of a light device 4a, a light device 4b, a light device 4c, and a light device 4d on the basis of the information input from the overall control ECU 2. The overall control ECU 2 receives information detected by each of the plurality of sensors in the vehicle device 1 or an image imaged by the camera in the vehicle device 1.

The vehicle speed sensor 1a detects the speed of a vehicle, and outputs an electrical signal (vehicle speed pulse) corresponding to a wheel speed to the overall control ECU 2.

The steering angle sensor 1b detects a steering angle of a vehicle, and outputs an electrical signal corresponding to the steering angle to the overall control ECU 2.

The accelerator sensor 1c detects the degree of opening of an accelerator of a vehicle, that is, the amount of operation of an accelerator pedal, and outputs operation amount information of the accelerator pedal to the overall control ECU 2.

The brake sensor 1d detects the amount of operation of a brake pedal of a vehicle, and outputs operation amount information of the brake pedal to the overall control ECU 2.

The shift sensor 1e detects the state (or change) of a shift lever of a vehicle, and outputs shift lever operation information such as a shift change by a vehicle driver to the overall control ECU 2.

The blinker sensor 1f detects operation of a blinker (direction indicator), and outputs information indicating a direction indicated by blinker operation to the overall control ECU 2.

The hazard sensor 1g detects operation of a hazard switch, and outputs hazard switch operation information to the overall control ECU 2.

The wiper sensor 1h detects operation of a wiper, and outputs wiper operation information to the overall control ECU 2.

The light sensor 1i detects operation of a light lever, and outputs light lever operation information to the overall control ECU 2.

The door open/close sensor 1j detects open/close of a door of a vehicle, and outputs door open/close information to the overall control ECU 2.

The driver camera 1k is a camera (imaging device) disposed at an in-vehicle position facing a driver's seat, and has a function of imaging a driver seated on the driver's seat. The driver camera 1k images a driver's face or upper body and outputs the shot image information to the overall control ECU 2.

The seating sensor 1l detects seating of an occupant of a vehicle, and for example, detects seating of the occupant by detecting attachment/detachment of a seat belt. The attachment/detachment of a seat belt may be detected using, for example, a pressure sensor. When an occupant is seated or away from a seat, the seating sensor 1l outputs information indicating that the occupant is seated or away from the seat to the overall control ECU 2.

The seating sensor 1l may be one or more pressure sensors disposed in a seat. The overall control ECU 2 may estimate an occupant's posture on the basis of information detected by each of the plurality of pressure sensors.

The acceleration sensor 1m detects the acceleration of a vehicle, and is for example, a triaxial acceleration sensor. When the acceleration sensor 1m detects vehicle acceleration information, the acceleration sensor 1m outputs this acceleration information to the overall control ECU 2.

The angular velocity sensor 1n detects the angular velocity (gyro) of a vehicle, and outputs angular velocity information to the overall control ECU 2. The overall control ECU 2 can detect a turning speed or the like of a vehicle on the basis of the angular velocity information.

The global positioning system (GPS) device 1o detects the position of a vehicle using radio waves transmitted from a GPS satellite, and outputs the position coordinates of the vehicle to the overall control ECU 2 and the navigation system 1p.

The navigation system 1p has a function of calculating a recommended route to a destination of a vehicle on the basis of a vehicle position and map information.

The navigation system 1p may calculate a recommended route of a vehicle on the basis of information such as traffic congestion information or traffic stop information around the vehicle, acquired through communication with an external device.

The navigation system 1p may be a device for receiving a recommended route calculated by a server on the basis of vehicle position information and vehicle destination information. The navigation system 1p outputs vehicle route information to the overall control ECU 2.

The out-of-vehicle camera 1q is a camera (imaging device) that is disposed in a vehicle and images the outside of the vehicle, for example, is disposed in each of the front, rear, left, and right directions of the vehicle, and outputs a shot image in each of the directions to the overall control ECU 2. The overall control ECU 2 executes detection and recognition of a person or detection and recognition of an object around a vehicle on the basis of a shot image input from the out-of-vehicle camera 1q.

The out-of-vehicle sensor 1r detects an object around a vehicle, and can be achieved by, for example, an ultrasonic sensor, a radar sensor, a millimeter wave radar sensor, or an infrared radar sensor. The out-of-vehicle sensor 1r outputs detection information of an object around a vehicle to the overall control ECU 2.

The overall control ECU 2 calculates the position of an object or a distance between the object and a vehicle on the basis of the object detection information input from the out-of-vehicle sensor 1r. Note that the position of the object or the distance between the object and the vehicle may be calculated by the overall control ECU 2, but may be calculated by the out-of-vehicle sensor 1r and output to the overall control ECU 2.

The illuminance sensor 1s is disposed in a vehicle, detects illuminance (brightness) outside the vehicle, and outputs the detected illuminance information to the overall control ECU 2.

The door knob sensor 1t detects whether or not an occupant of a vehicle has touched a door knob, and outputs detection information indicating that the occupant has touched the door knob to the overall control ECU 2.

The seat belt sensor 1u detects attachment/detachment of a seat belt on a seat, and outputs detection information indicating attachment/detachment of the seat belt to the overall control ECU 2.

The overall control ECU 2 has a function of controlling an entire vehicle. As illustrated in FIG. 1, the overall control ECU 2 includes a processor 2a, a read only memory (ROM) 2b, and a random access memory (RAM) 2c.

The processor 2a is a calculation processing circuit for executing various calculation processes in the overall control ECU 2, and is hardware called a processor, a calculation processing circuit, an electric circuit, a controller, or the like. The processor 2a includes a set of one or two or more calculation processing circuits. The processor 2a can execute a calculation process by expanding a program read from the ROM 2b on the RAM 2c.

The ROM 2b is a non-volatile storage device for storing one or more programs. The RAM 2c is a volatile storage device used by the processor 2a as an expansion area for programs and various types of information. The ROM 2b and the RAM 2c are constituted by, for example, semiconductor storage devices and can also be called memories.

Note that in FIG. 1, the ROM 2b is illustrated as a storage device for storing a program executed by the processor 2a, but the storage device is not limited thereto.

For example, the storage device may be a non-volatile mass storage device called a storage such as a hard disk drive (HDD) or a solid state drive (SSD). A storage device including a storage may be collectively called a memory. The same applies to an irradiation apparatus 3 described later.

An engine 2d is a power source for generating power for rotating wheels, and may be an internal combustion engine driven by burning fuel or a motor driven by electric energy. The engine 2d can also operate by an instruction from the overall control ECU 2.

A transmission 2e transmits power generated by the engine 2d to wheels. The transmission 2e changes a torque transmitted to wheels by changing a gear according to an instruction from the overall control ECU 2.

A brake actuator 2f is a mechanism for operating a brake (reduction gear) of a vehicle, operates the brake on the basis of an instruction from the overall control ECU 2, and decelerates the vehicle.

A steering actuator 2g is a mechanism for operating steering (steering device) of a vehicle, and can control a traveling direction of the vehicle by controlling steering on the basis of an instruction from the overall control ECU 2.

A head-up display (HUD) 2h is a transmissive display device for displaying information by superimposing the information in a front field of view of a driver, and can display the information on a windshield or the like on the basis of an instruction from the overall control ECU 2.

An in-vehicle monitor 2i displays information in a vehicle, and is achieved, for example, by a monitor of the navigation system 1p. Note that the in-vehicle monitor 2i may be a rearview mirror monitor attached to a rearview mirror.

The lighting control device 3A controls various light devices disposed in a vehicle, and includes an integration determination ECU 3a and a light control ECU 3b.

A vehicle in the first embodiment has a function of notifying a person around the vehicle of a vehicle state, an operation intention, or a warning by light emitted from various light devices. The light device is a general term for the light devices 4a to 4d.

The integration determination ECU 3a determines the situation inside and outside the vehicle on the basis of information indicating the situation inside and outside the vehicle input from the overall control ECU 2 or a wireless communication device 5, and determines information which should be displayed outside the vehicle by controlling the light device. The integration determination ECU 3a includes a processor 3a-1, a ROM 3a-2, and a RAM 3a-3. The processor 3a-1 is a calculation processing circuit for performing various types of calculation processes in the integration determination ECU 3a. The processor 3a-1 includes a set of one or more calculation processing circuits. The processor 3a-1 can execute a calculation process by expanding a program read from the ROM 3a-2 on the RAM 3a-3.

Light control ECU 3b displays information outside the vehicle by controlling light irradiation by the light device. The light control ECU 3b determines the irradiation shape, size, color, brightness, irradiation position, time, and irradiation timing of light by the light device on the basis of information input from the integration determination ECU 3a, and instructs the light device to emit light with the determined contents.

The light control ECU 3b includes a processor 3b-1, a ROM 3b-2, and a RAM 3b-3. The processor 3b-1 is a calculation processing circuit for performing various types of calculation processes in the light control ECU 3b. The processor 3b-1 includes a set of one or more calculation processing circuits. The processor 3b-1 can execute a calculation process by expanding a program read from the ROM 3b-2 on the RAM 3b-3.

The light device 4a is an irradiation unit for displaying information by irradiating the outside of a vehicle with light, and displays information by irradiating a road surface or a wall surface outside the vehicle with light.

The information displayed outside the vehicle by the light device 4a includes, for example, information indicating operation which the vehicle is going to perform, information indicating a current state of the vehicle, and information for attracting attention to the operation which the vehicle is going to perform.

The light device 4a displays the information outside the vehicle with a light pattern, an image shape, a size, a color, brightness, an irradiation position, time, and irradiation timing suitable for each of these pieces of information.

The light device 4a includes a light driver 4a1 and a light 4a2. The light driver 4a1 is a drive device for driving the light 4a2, and controls light irradiation by the light 4a2. The light 4a2 displays a light pattern, an animation, or an image outside the vehicle by irradiating the outside the vehicle with light.

The light pattern includes one or more light elements.

The animation is obtained by continuously changing an irradiation state of the light pattern. Examples of the animation include an animation in which a plurality of light patterns is sequentially lit, and light patterns appear to increase sequentially from a person outside the vehicle, and an animation in which a plurality of light patterns repeats lighting and extinction alternately.

The image is a mark, text information, or a moving image projected outside the vehicle by light irradiation. The image is a warning mark for attracting attention of a person outside the vehicle, or a text indicating the state of the vehicle.

The light device 4b is an irradiation unit for displaying information outside the vehicle by emitting light on an outer surface of a vehicle body or emitting light from the vehicle body toward the outside.

Similar to the light device 4a, information displayed outside the vehicle by the light device 4b includes information indicating operation which the vehicle is going to perform, information indicating a current state of the vehicle, and information for attracting attention to the operation which the vehicle is going to perform. The light device 4b displays the information outside the vehicle with a shape, a size, a color, brightness, an irradiation position, time, and irradiation timing of a light pattern, suitable for each of these pieces of information.

The light device 4b includes a light driver 4b1 and a light 4b2. The light driver 4b1 is a drive device for driving the light 4b2, and controls light irradiation by the light 4b2. The light 4b2 is a device for displaying information by emitting light from an outer surface of the vehicle or a vehicle body toward the outside, and is for example, a display device using a liquid crystal display (LCD) and a light emitting diode (LED). In this display device, a display surface is directed to the outside of the vehicle, and the outside of the vehicle is irradiated with light emitted from the LED and light that has passed through the LCD. The light 4b2 may be organic electroluminescence (organic EL) having a display surface directed to the outside of the vehicle.

That is, the light device 4b may be a display device for displaying information outside the vehicle by directly or indirectly irradiating the outside of the vehicle with backlight or image display light as described above.

The light device 4c includes a light driver 4c1 and a light 4c2. The light driver 4c1 is a drive device for driving the light 4c2, and controls lighting of the light 4c2. The light 4c2 is an in-vehicle lamp for emitting light in the interior of the vehicle, and is achieved by, for example, a door knob lamp for illuminating a door knob in the vehicle.

The light device 4d includes a light driver 4d1 and a light 4d2. The light driver 4d1 is a device for driving the light 4d2 in accordance with an instruction from the overall control ECU 2 or the light control ECU 3b, and controls light irradiation by the light 4d2. The light 4d2 is a general term for various out-of-vehicle lamps for emitting light outside the vehicle. Examples of the out-of-vehicle lamp include a headlight, a blinker lamp, a side mirror lamp, and a brake lamp.

The wireless communication device 5 performs wireless communication with an external communication device, and includes an antenna 5a, a transmitting unit 5b, and a receiving unit 5c. The transmitting unit 5b transmits a radio signal to an external communication device via the antenna 5a, and the receiving unit 5c receives a radio signal from the external communication device via the antenna 5a and outputs the radio signal to the integration determination ECU 3a.

The wireless communication device 5 may perform vehicle-to-vehicle communication with a wireless communication device mounted on another vehicle, may perform road-to-vehicle communication with a wireless communication device disposed in a roadside device, or may communicate with a communication terminal such as a smartphone.

A communication method of the wireless communication device 5 may be a unique communication method using a predetermined frequency band or a communication method of an existing communication standard.

For example, a communication method of an existing communication standard such as wireless local area network (wireless LAN), Bluetooth (registered trademark), or Zigbee (registered trademark) may be used.

Figure 2:
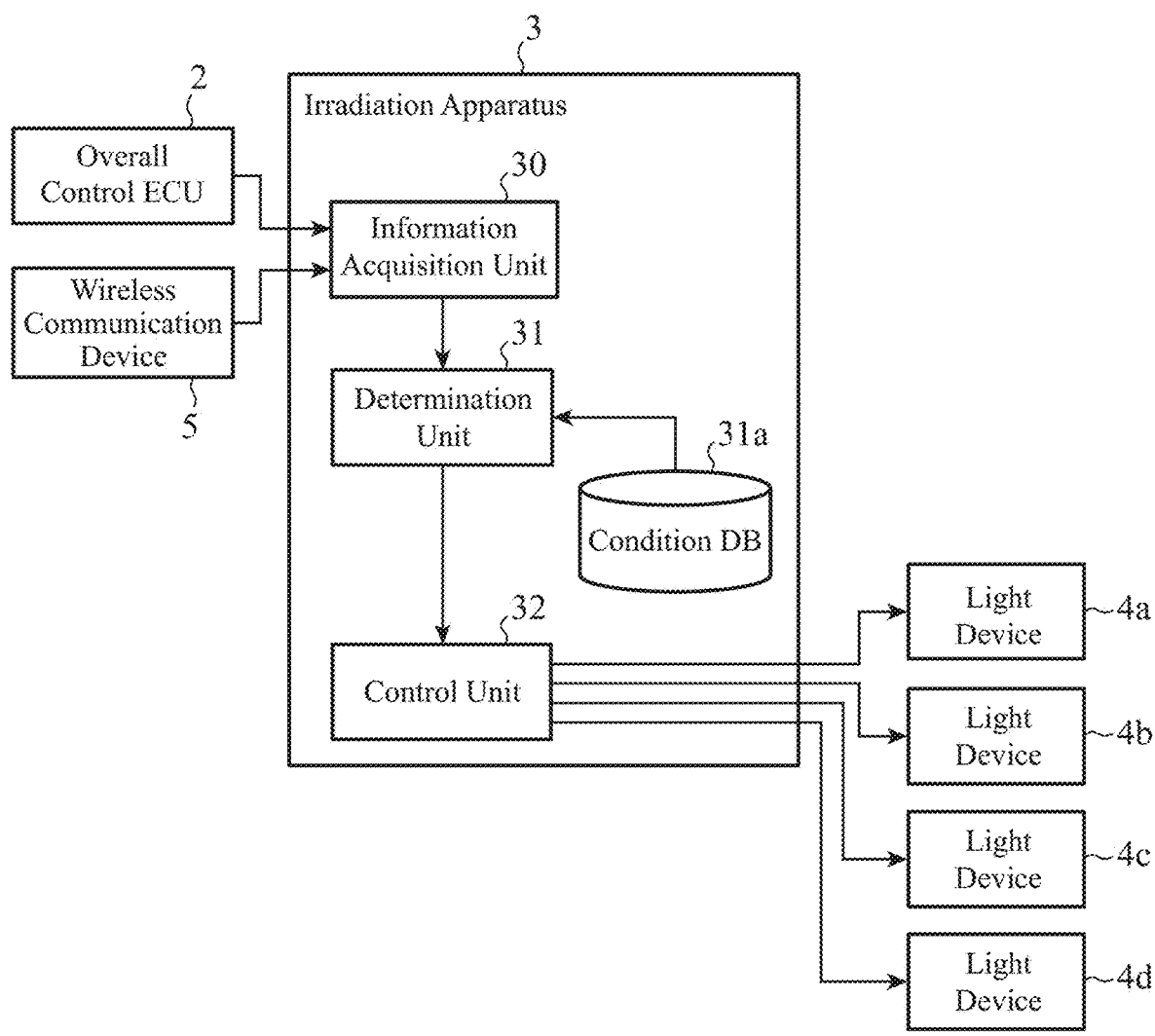
FIG. 2 is a block diagram illustrating a functional configuration of an irradiation apparatus according to the first embodiment.

FIG. 2 is a block diagram illustrating a functional configuration of the irradiation apparatus 3 according to the first embodiment.

The irradiation apparatus 3 is achieved by the lighting control device 3A and the light devices 4a to 4d, and controls light irradiation by the light devices 4a to 4d. As a functional configuration of the irradiation apparatus 3, the irradiation apparatus 3 includes an information acquisition unit 30, a determination unit 31, a condition database (hereinafter referred to as condition DB) 31a, and a control unit 32.

The information acquisition unit 30 acquires information regarding the situation inside and outside the vehicle from the overall control ECU 2 or the wireless communication device 5. A function of the information acquisition unit 30 is implemented by execution of a program read from the ROM 3a-2 by the processor 3a-1 of the integration determination ECU 3a. The information regarding the situation inside and outside the vehicle is information detected by various sensors, information acquired by an in-vehicle device, or an image or a video imaged by a camera in the vehicle device 1.

The condition DB 31a is a database storing a display start condition, a display change condition, a display return condition, and a display end condition, and is formed, for example, on a storage area of the ROM 3a-2 of the integration determination ECU 3a.

The display start condition collectively includes condition information regarding the situation inside and outside the vehicle and display information of a vehicle state corresponding to the condition information.

Examples of the vehicle state include a vehicle state where a door of the vehicle is about to be opened, a vehicle state where the vehicle is about to move forward or backward, a vehicle state where the vehicle is about to turn right or left, a vehicle state where crossing in front of the vehicle is permitted, a vehicle state where boarding guidance to the vehicle is being provided, and a vehicle state where attention of a pedestrian around the vehicle is attracted.

The above display information includes a light pattern, an animation, and an image indicating the vehicle state.

The determination unit 31 determines whether or not the information regarding the situation inside and outside the vehicle acquired by the information acquisition unit 30 meets a display start condition. For example, by comparing the information regarding the situation inside and outside the vehicle acquired by the information acquisition unit 30 with a display start condition stored in the condition DB 31a, the determination unit 31 determines whether or not the information regarding the situation inside and outside the vehicle meets condition information regarding the situation inside and outside the vehicle in the display start condition.

Note that a function of the determination unit 31 is implemented by execution of a program read from the ROM 3a-2 by the processor 3a-1 of the integration determination ECU 3a.

When the determination unit 31 determines that the information regarding the situation inside and outside the vehicle meets the condition information regarding the situation inside and outside the vehicle in the display start condition, the determination unit 31 outputs display information of the vehicle state corresponding to the display start condition to the control unit 32.

Note that when the determination unit 31 determines that the information regarding the situation inside and outside the vehicle meets each of a plurality of display start conditions stored in the condition DB 31a, the determination unit 31 outputs a plurality of pieces of display information corresponding to each of the display start conditions, to the control unit 32.

After display of the information outside the vehicle, the determination unit 31 determines whether or not the information regarding the situation inside and outside the vehicle acquired by the information acquisition unit 30 meets a display change condition.

The display change condition collectively includes display information of a vehicle state, condition information regarding the situation inside and outside the vehicle where the display information should be changed, and information indicating a display mode of the above display information after the change. Examples of a condition under which the display information should be changed include a case where a pedestrian has come close within a certain distance range from a door of the vehicle when an animation indicating a vehicle state where the door is about to be opened is displayed.

Examples of the display mode after the change include a mode in which the blinking speed of a light pattern in the animation is increased (for example, double speed).

By comparing information regarding the situation inside and outside the vehicle acquired by the information acquisition unit 30 with a display change condition stored in the condition DB 31a, the determination unit 31 determines whether or not the information regarding the situation inside and outside the vehicle meets condition information regarding the situation inside and outside the vehicle in the display change condition. When the determination unit 31 determines that the information regarding the situation inside and outside the vehicle meets the condition information regarding the situation inside and outside the vehicle in the display change condition, the determination unit 31 outputs information indicating a display mode after the change corresponding to the display change condition to the control unit 32.

After the change of the display mode of the information displayed outside the vehicle, the determination unit 31 determines whether or not the information regarding the situation inside and outside the vehicle acquired by the information acquisition unit 30 meets a display return condition. The display return condition collectively includes display information in which a display mode has been changed and condition information regarding the situation inside and outside the vehicle in which the display information should be returned to the display mode before the change.

Examples of a condition under which the display information should be returned to the display mode before the change include a case where a pedestrian goes away from a door of the vehicle by a certain distance or more after change of the display mode of an animation indicating a vehicle state where the door is about to be opened.

By comparing information regarding the situation inside and outside the vehicle acquired by the information acquisition unit 30 with a display return condition stored in the condition DB 31a, the determination unit 31 determines whether or not the information regarding the situation inside and outside the vehicle meets condition information regarding the situation inside and outside the vehicle in the display return condition. When the determination unit 31 determines that the information regarding the situation inside and outside the vehicle meets the condition information regarding the situation inside and outside the vehicle in the display return condition, the determination unit 31 outputs the determination result to the control unit 32.

The determination unit 31 determines whether or not the information regarding the situation inside and outside the vehicle acquired by the information acquisition unit 30 meets a display end condition.

The display end condition is information in which condition information regarding the situation inside and outside the vehicle where display of the display information should be ended is set.

Examples of a condition under which the display of the display information should be ended include a case where there is no pedestrian who should be informed of a vehicle state where a door of the vehicle is about to be opened around the vehicle.

By comparing information regarding the situation inside and outside the vehicle acquired by the information acquisition unit 30 with a display end condition stored in the condition DB 31a, the determination unit 31 determines whether or not the information regarding the situation inside and outside the vehicle meets condition information regarding the situation inside and outside the vehicle in the display end condition. When the determination unit 31 determines that the information regarding the situation inside and outside the vehicle meets the condition information regarding the situation inside and outside the vehicle in the display end condition, the determination unit 31 outputs the determination result to the control unit 32.

The control unit 32 displays one or more pieces of display information input from the determination unit 31 and corresponding to one or more display start conditions outside the vehicle by controlling the light device 4a and the light device 4b. The display information is displayed outside the vehicle in a form of a light pattern, an animation, or an image.

A function of the control unit 32 is implemented by execution of a program read from the ROM 3b-2 by the processor 3b-1 of the light control ECU 3b.

When the determination unit 31 determines that the information regarding the situation inside and outside the vehicle meets the display change condition, the control unit 32 changes a display mode of the information displayed outside the vehicle by controlling the light device 4a and the light device 4b.

For example, the control unit 32 changes the display mode of the display information by controlling the light device 4a and the light device 4b on the basis of the information indicating the display mode of the display information after the change, input from the determination unit 31. At this time, the control unit 32 stores information indicating the display mode before the change in the ROM 3b-2.

When the determination unit 31 determines that the information regarding the situation inside and outside the vehicle meets the display return condition, the control unit 32 returns the information the display mode of which has been changed to the display mode before the change by controlling the light device 4a and the light device 4b.

For example, when the determination unit 31 inputs a determination result that the information regarding the situation inside and outside the vehicle meets the display return condition to the control unit 32, the control unit 32 returns the display information to the display mode before the change by controlling the light device 4a and the light device 4b on the basis of the information indicating the display mode stored in the ROM 3b-2 before the change.

When the determination unit 31 inputs a determination result that the information regarding the situation inside and outside the vehicle meets the display end condition to the control unit 32, the control unit 32 ends the display of the display information by controlling the light device 4a and the light device 4b.

Next, the operation will be described.

Figure 3:
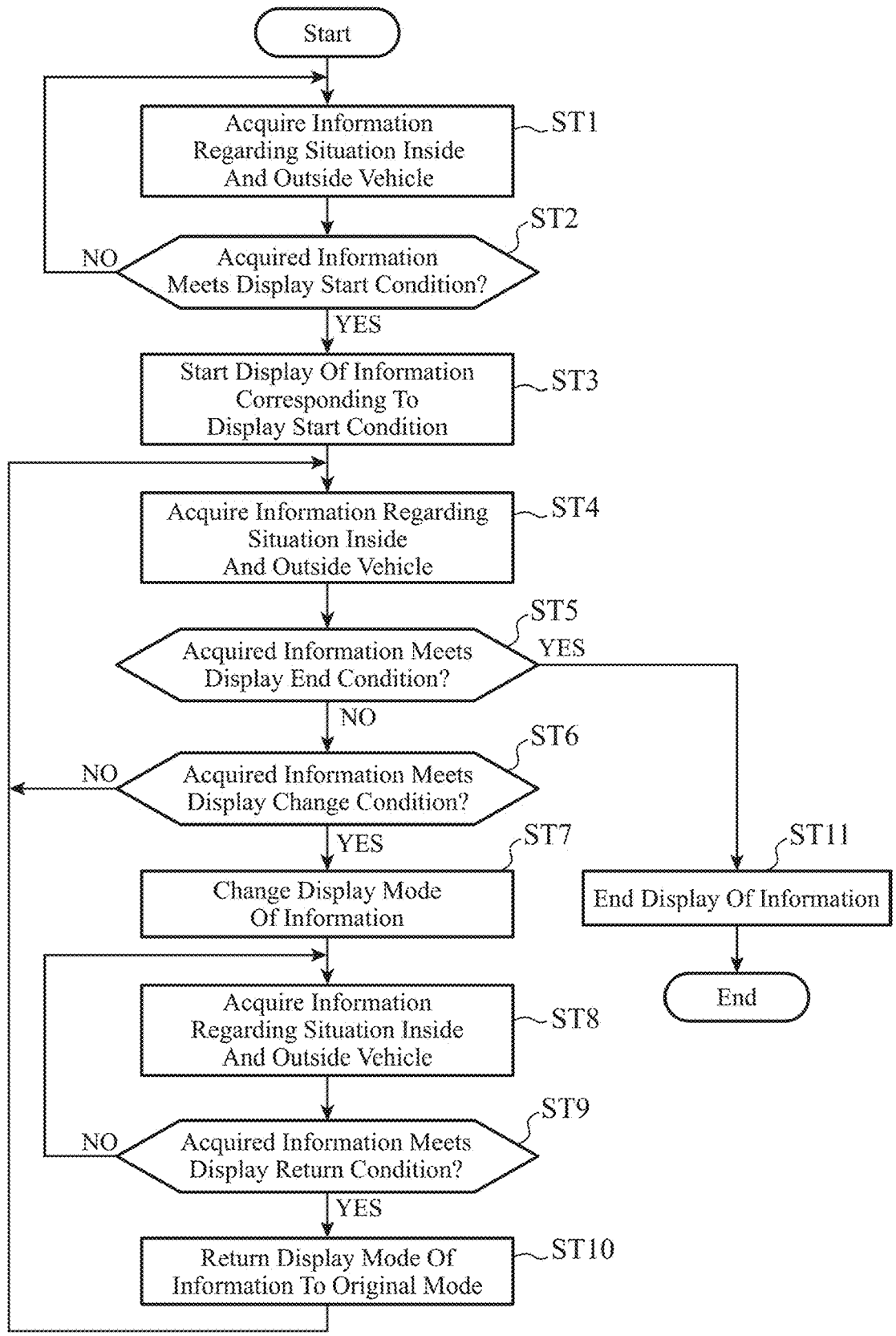
FIG. 3 is a flowchart illustrating an irradiation method according to the first embodiment.

FIG. 3 is a flowchart illustrating an irradiation method according to the first embodiment.

First, the information acquisition unit 30 acquires information regarding the situation inside and outside the vehicle from the overall control ECU 2 (step ST1).

The information regarding the situation inside and outside the vehicle is detected by various sensors and vehicle devices included in the in-vehicle device 1.

Examples of the information include vehicle speed information, steering angle information, accelerator operation information, brake operation information, shift lever operation information, blinker operation information, hazard switch operation information, wiper operation information, light lever operation information, door open/close information, driver imaging information, occupant seating information, vehicle acceleration information, angular velocity information, position information, route information, imaging information around a vehicle, object detection information around a vehicle, illuminance information around a vehicle, door knob touch information, and seat belt attachment/detachment information. The information acquisition unit 30 outputs information regarding the situation inside and outside the vehicle to the determination unit 31.

By comparing information regarding the situation inside and outside the vehicle acquired by the information acquisition unit 30 with a display start condition stored in the condition DB 31a, the determination unit 31 determines whether or not the information regarding the situation inside and outside the vehicle meets condition information regarding the situation inside and outside the vehicle in the display start condition (step ST2).

If the determination unit 31 determines that the information regarding the situation inside and outside the vehicle meets the display start condition (step ST2; YES), the determination unit 31 outputs display information of a vehicle state corresponding to the display start condition to the control unit 32.

Meanwhile, if the determination unit 31 determines that the information regarding the situation inside and outside the vehicle does not meet the display start condition (step ST2; NO), the process of step ST1 is repeated.

Note that the determination unit 31 may change a combination of conditions in the display start condition depending on the situation inside and outside the vehicle. For example, when the wiper sensor 1h detects that a wiper is operating (when it is raining), the determination unit 31 changes an illuminance condition effective for road surface display. When it is dry, for example, the illuminance condition is set to 50 lux or more. However, the illuminance condition is set to 20 lux when it is raining because irregular reflection of light occurs. The determination unit 31 determines whether or not the situation inside and outside the vehicle meets the display start condition by comparing the changed condition with information regarding the situation inside and outside the vehicle.

In a display start condition corresponding to a vehicle state where a door of the vehicle is about to be opened, for example, conditions (1) to (14) are set as condition information regarding the situation inside and outside the vehicle.

(1) The vehicle speed is zero.
(2) The amount of operation of an accelerator pedal is zero.
(3) A brake pedal is operated.
(4) A shift lever is at a parking position.
(5) A hazard lamp is lit.
(6) A light lever is operated.
(7) A vehicle door is closed.
(8) An occupant in the vehicle is seated.
(9) A vehicle acceleration is zero.
(10) The vehicle is at a position where the vehicle can stop.
(11) There is a moving object (for example, a pedestrian or a bicycle) around the vehicle.
(12) Illuminance is effective for road surface display.
(13) An occupant is touching a door knob in the vehicle.
(14) A seat belt of the occupant touching the door knob is detached.

When the information regarding the situation inside and outside the vehicle meets all or some of the conditions (1) to (14), the determination unit 31 determines that the information regarding the situation inside and outside the vehicle meets the above display start condition corresponding to a vehicle state where a door of the vehicle is about to be opened.

In a display start condition corresponding to a vehicle state where the vehicle is about to move forward or backward, for example, conditions (1a) to (8a) are set as condition information regarding the situation inside and outside the vehicle.

(1a) The vehicle speed is a speed at which the vehicle can stop suddenly.
(2a) An accelerator pedal is operated.
(3a) A shift lever is at a drive position or a reverse position.
(4a) A hazard lamp is lit.
(5a) A light lever is operated.
(6a) The vehicle is at a position where the vehicle can move forward or backward.
(7a) There is a moving object (for example, a pedestrian or a bicycle) around the vehicle.
(8a) Illuminance is effective for road surface display.

When the information regarding the situation inside and outside the vehicle meets all or some of the conditions (1a) to (8a), the determination unit 31 determines that the information regarding the situation inside and outside the vehicle meets the above display start condition corresponding to a vehicle state where the vehicle is about to move forward or backward.

In a display start condition corresponding to a vehicle state where the vehicle is about to turn left or right, for example, conditions (1b) to (8b) are set as condition information regarding the situation inside and outside the vehicle.

(1b) The vehicle speed is a speed at which the vehicle can stop suddenly.
(2b) An accelerator pedal is operated.
(3b) A shift lever is at a drive position.
(4b) A blinker is operated.
(5b) A light lever is operated.
(6b) The vehicle is at a position where the vehicle can turn left or right.
(7b) There is a moving object (for example, a pedestrians or a bicycle) around the vehicle.
(8b) Illuminance is effective for road surface display.

When the information regarding the situation inside and outside the vehicle meets all or some of the conditions (1b) to (8b), the determination unit 31 determines that the information regarding the situation inside and outside the vehicle meets the above display start condition corresponding to a vehicle state where the vehicle is about to turn left or right.

In a display start condition corresponding to a vehicle state where crossing in front of the vehicle is permitted, conditions (1c) to (9c) are set as condition information regarding the situation inside and outside the vehicle.

(1c) The vehicle speed is zero or a speed at which the vehicle can stop suddenly.

(2c) The amount of operation of an accelerator pedal is zero.

(3c) A brake pedal is operated.

(4c) A shift lever is at a parking position.

(5c) A light lever is operated.

(6c) A driver recognizes a pedestrian trying to cross a road in front of the vehicle.

(7c) The vehicle is at a position where a pedestrian can cross a road.

(8c) There is a moving object (for example, a pedestrian or a bicycle) trying to cross a road in front of the vehicle.

(9c) Illuminance is effective for road surface display.

When the information regarding the situation inside and outside the vehicle meets all or some of the conditions (1c) to (9c), the determination unit 31 determines that the information regarding the situation inside and outside the vehicle meets the above display start condition corresponding to a vehicle state where crossing in front of the vehicle is permitted.

In a display start condition corresponding to a vehicle state where boarding guidance to the vehicle is being provided, conditions (1d) to (5d) are set as condition information regarding the situation inside and outside the vehicle.

(1d) The vehicle speed is zero or a speed at which the vehicle can stop suddenly.

(2d) A light lever is operated.

(3d) The vehicle is at a position where boarding guidance is possible.

(4d) There is a target person for boarding guidance.

(5d) Illuminance is effective for road surface display.

When the information regarding the situation inside and outside the vehicle meets all or some of the conditions (1d) to (5d), the determination unit 31 determines that the information regarding the situation inside and outside the vehicle meets the above display start condition corresponding to a vehicle state where boarding guidance to the vehicle is being provided.

Note that an example of the display start condition has been described so far. However, the display start condition may be a condition other than the above-described condition as long as indicating a vehicle state of which a person outside the vehicle should be informed.

The control unit 32 starts displaying the above display information outside the vehicle by controlling the light device 4a or the light device 4b on the basis of display information input from the determination unit 31 (step ST3).

Figure 4A:
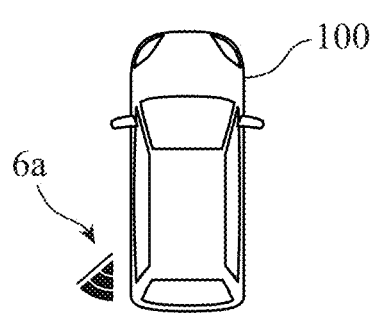
FIG. 4A is a diagram illustrating an example of display information for notifying a person outside a vehicle of a vehicle state where a vehicle door is about to be opened.
Figure 4B:
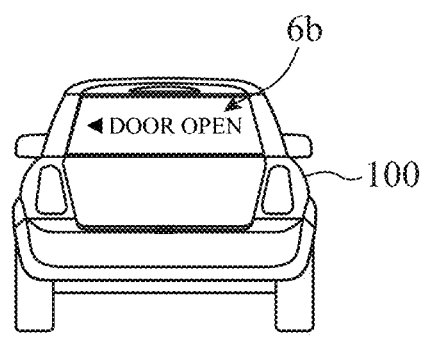
FIG. 4B is a diagram illustrating another example of display information for notifying a person outside a vehicle of a vehicle state where a vehicle door is about to be opened.

FIG. 4A is a diagram illustrating display information 6a for notifying a person outside a vehicle 100 of a vehicle state where the left rear door of the vehicle 100 is about to be opened, and illustrates the vehicle 100 viewed from above. FIG. 4B is a diagram illustrating display information 6b for notifying a person outside the vehicle 100 of the vehicle state where the left rear door of the vehicle 100 is about to be opened, and illustrates the vehicle 100 viewed from the rear side.

For example, at least one of the display information 6a illustrated in FIG. 4A and the display information 6b illustrated in FIG. 4B is associated with condition information regarding the situation inside and outside the vehicle 100 in a display start condition corresponding to a vehicle state where the left rear door of the vehicle 100 is about to be opened.

As illustrated in FIG. 4A, the display information 6a is an animation of a fan-shaped irradiation figure including three light patterns, and is displayed on a road surface on a side of the left rear door of the vehicle 100 by the light 4a2. This animation is an irradiation figure to be lit sequentially from a light pattern at a position of the pivot point of the fan to a light pattern at an end position thereof. The fan shape of the animation corresponds to a range in which the left rear door moves when the left rear door is opened or closed. By visually recognizing the display information 6a displayed on a road surface on a side of the vehicle 100, a pedestrian who has moved to the side of the vehicle 100 from the rear thereof can recognize that the left rear door will be opened, and can further recognize a range in which the left rear door moves when the left rear door is opened or closed.

As illustrated in FIG. 4B, the display information 6b is an image of a text "DOOR OPEN", and is displayed on a rear window of the vehicle 100 by the light 4b2.

By visually recognizing the display information 6b displayed on the rear window of the vehicle 100, the pedestrian who has moved from the rear of the vehicle 100 can recognize that the left rear door will be opened. It is difficult for a driver to visually recognize the state of the outside of the left rear door of the vehicle 100.

Therefore, in the first embodiment, by displaying the display information 6a or the display information 6b, attention of a moving object outside the vehicle (for example, a pedestrian, a bicycle, or another vehicle) is attracted to opening of the left rear door of the vehicle 100. In FIG. 4, the left rear door is exemplified, but the present invention may be applied to a left front door, a right front door, or a right rear door. The display content is an example, and therefore change may be possible depending on the shape of the vehicle or the like.

Figure 5A:
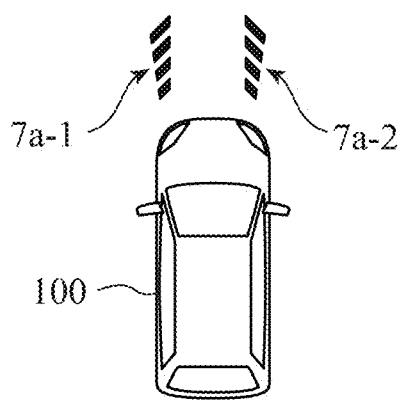
FIG. 5A is a diagram illustrating an example of display information for notifying a person outside a vehicle of a vehicle state where the vehicle is about to move forward.

FIG. 5A is a diagram illustrating display information 7a-1 and 7a-2 for notifying a person outside the vehicle 100 of a vehicle state where the vehicle 100 is about to move forward, and illustrates the vehicle 100 viewed from above.

Figure 5B:
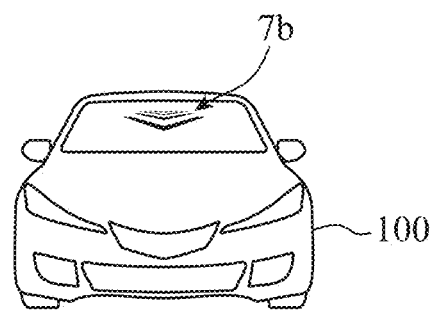
FIG. 5B is a diagram illustrating another example of display information for notifying a person outside a vehicle of a vehicle state where the vehicle is about to move forward.

FIG. 5B is a diagram illustrating display information 7b for notifying a person outside the vehicle 100 of the vehicle state where the vehicle 100 is about to move forward, and illustrates the vehicle 100 viewed from the rear side.

For example, at least one of the display information 7a-1 and 7a-2 illustrated in FIG. 5A and the display information 7b illustrated in FIG. 5B is associated with condition information regarding the situation inside and outside the vehicle 100 in a display start condition corresponding to the vehicle state where the vehicle 100 is about to move forward.

As illustrated in FIG. 5A, the display information 7a-1 and 7a-2 are each a band-shaped animation including four light patterns, and are displayed on a road surface on the left front and the right front of the vehicle 100 by the light 4a2, respectively. In the animation, a series of operations is repeated in which a light pattern is sequentially lit from a light pattern closest to the vehicle 100 to a light pattern farthest from the vehicle 100 and then all the light patterns are extinguished. The band shape of the animation corresponds to a moving direction of the vehicle 100.

By visually recognizing the display information 7a-1 and 7a-2 displayed on a road surface on a side of the vehicle 100, a pedestrian who has moved to a front side of the vehicle 100 can recognize that the vehicle 100 is going to move forward. Note that the display content is an example, and therefore change may be possible depending on the shape of the vehicle or the like.

As illustrated in FIG. 5B, the display information 7b is an image of an arrow mark indicating a traveling direction of the vehicle 100, and is displayed on a windshield of the vehicle 100 by the light 4b2.

By visually recognizing the display information 7b displayed on the windshield of the vehicle 100, a pedestrian who has moved to a front side of the vehicle 100 can recognize that the vehicle 100 is going to move forward.

FIG. 6A is a diagram illustrating display information 8a for notifying a person outside the vehicle 100 of a vehicle state where the vehicle 100 is about to move backward, and illustrates the vehicle 100 viewed from above. FIG. 6B is a diagram illustrating display information 8b for notifying a person outside the vehicle 100 of a vehicle state where the vehicle 100 is about to move backward, and illustrates the vehicle 100 viewed from the rear side.

For example, at least one of the display information 8a illustrated in FIG. 6A and the display information 8b illustrated in FIG. 6B is associated with condition information regarding the situation inside and outside the vehicle 100 in a display start condition corresponding to a vehicle state where the vehicle 100 is about to move backward.

As illustrated in FIG. 6A, the display information 8a is an arrow-shaped animation including four light patterns, and is displayed on a road surface behind the vehicle 100 by the light 4a2. In the animation, a series of operations is repeated in which a light pattern is sequentially lit from a light pattern closest to the vehicle 100 to a light pattern farthest from the vehicle 100 and then all the light patterns are extinguished. The arrow shape of the animation corresponds to a moving direction of the vehicle 100.

By visually recognizing the display information 8a displayed on a road surface behind the vehicle 100, a pedestrian who has moved to the rear of the vehicle 100 can recognize that the vehicle 100 is going to move backward.

As illustrated in FIG. 6B, the display information 8b is an image of an arrow mark indicating a traveling direction of the vehicle 100, and is displayed on a rear window of the vehicle 100 by the light 4b2.

By visually recognizing the display information 8b displayed on the rear window of the vehicle 100, a pedestrian who has moved to the rear of the vehicle 100 can recognize that the vehicle 100 is going to move backward. Note that the display content is an example, and therefore change may be possible depending on the shape of the vehicle or the like.

FIG. 7 is a diagram illustrating display information 9 for notifying a person outside the vehicle 100 of a vehicle state where the vehicle 100 is about to turn left, and illustrates the vehicle 100 viewed from above. For example, the display information 9 illustrated in FIG. 7 is associated with condition information regarding the situation inside and outside the vehicle in a display start condition for notifying a person outside the vehicle 100 of a vehicle state where the vehicle 100 is about to turn left.

The display information 9 is an image of a mark for attracting attention to left turn of the vehicle 100, and is displayed on a road surface on the left rear of the vehicle 100 by the light 4a2 as illustrated in FIG. 7. By visually recognizing the display information 9 displayed on a road surface on the left rear of the vehicle 100, a rider of a bicycle who is about to move from the rear side of the vehicle 100 to a side thereof can recognize that the vehicle 100 is about to turn left.

FIG. 8A is a diagram illustrating display information 10a for notifying a person outside the vehicle 100 of a vehicle state where crossing in front of the vehicle 100 is permitted, and illustrates the vehicle 100 viewed from above. FIG. 8B is a diagram illustrating display information 10b for notifying a person outside the vehicle 100 of a vehicle state where crossing in front of the vehicle 100 is permitted, and illustrates the vehicle 100 viewed from the front side.

For example, at least one of the display information 10a illustrated in FIG. 8A and the display information 10b illustrated in FIG. 8B is associated with condition information regarding the situation inside and outside the vehicle 100 in a display start condition corresponding to a vehicle state where crossing in front of the vehicle 100 is permitted.

As illustrated in FIG. 8A, the display information 10a is an image of an arrow mark in a direction crossing a road in front of the vehicle 100, and is displayed on a road surface on the left front of the vehicle 100 by the light 4a2. By visually recognizing the display information 10a displayed on a road surface in front of the vehicle 100, a pedestrian who has moved to the left front of the vehicle 100 can recognize that crossing in front of the vehicle 100 is permitted.

As illustrated in FIG. 8B, the display information 10b is an image of a text "GO AHEAD" and is displayed on a windshield of the vehicle 100 by the light 4b2. By visually recognizing the display information 10b displayed on the windshield of the vehicle 100, a pedestrian who has moved to the left front of the vehicle 100 can recognize that crossing in front of the vehicle 100 is permitted. Note that the display content is an example, and therefore change may be possible depending on the shape of the vehicle or the like.

Figure 9A:
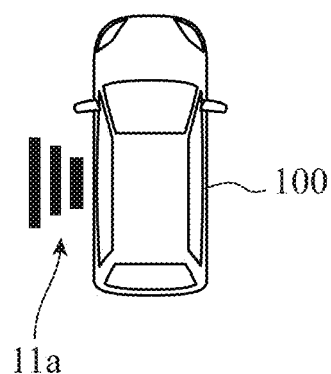
FIG. 9A is a diagram illustrating an example of display information for notifying a person outside a vehicle of a vehicle state where boarding guidance is being provided.
Figure 9B:
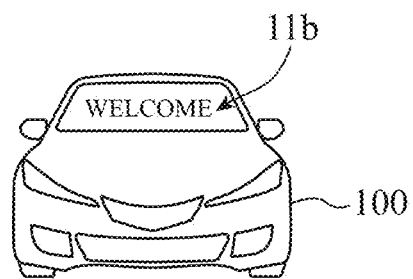
FIG. 9B is a diagram illustrating another example of display information for notifying a person outside a vehicle of a vehicle state where boarding guidance is being provided.

FIG. 9A is a diagram illustrating display information 11a for notifying a person outside the vehicle 100 of a vehicle state where boarding guidance is being provided, and illustrates the vehicle 100 viewed from above. FIG. 9B is a diagram illustrating display information 11b for notifying a person outside the vehicle 100 of the vehicle state where boarding guidance is being provided, and illustrates the vehicle 100 viewed from the front side. For example, at least one of the display information 11a illustrated in FIG. 9A and the display information 11b illustrated in FIG. 9B is associated with condition information regarding the situation inside and outside the vehicle 100 in a display start condition corresponding to a vehicle state where boarding guidance is being provided.

As illustrated in FIG. 9A, the display information 11a is a band-shaped animation including three light patterns, and is displayed on a road surface on a left side of the vehicle 100 by the light 4a2. In the animation, a series of operations is repeated in which a light pattern is sequentially lit from a light pattern farthest from the vehicle 100 to a light pattern closest to the vehicle 100 and then all the light patterns are extinguished. The band shape of the animation corresponds to a boarding direction to the vehicle 100. By visually recognizing the display information 11a displayed on a road surface on a left side of the vehicle 100, a pedestrian who has moved to the left side of the vehicle 100 can recognize that the vehicle 100 is providing boarding guidance.

As illustrated in FIG. 9B, the display information 11b is an image of a text "WELCOME" and is displayed on a windshield of the vehicle 100 by the light 4b2.

By visually recognizing the display information 11b displayed on the windshield of the vehicle 100, a pedestrian who has moved to the front of the vehicle 100 can recognize that the vehicle 100 is providing boarding guidance. Note that the display content is an example, and therefore change may be possible depending on the shape of the vehicle or the like.

Now, return to the description of FIG. 3.

Even after display of the display information outside the vehicle, the information acquisition unit 30 acquires information regarding the situation inside and outside the vehicle from the overall control ECU 2 (step ST4). The information regarding the situation inside and outside the vehicle acquired by the information acquisition unit 30 is output to the determination unit 31.

Next, the determination unit 31 determines whether or not the information regarding the situation inside and outside the vehicle acquired by the information acquisition unit 30 meets a display end condition (step ST5).

Here, if the determination unit 31 determines that the information regarding the situation inside and outside the vehicle does not meet the display end condition (step ST5; NO), the process proceeds to step ST6.

Note that the display end condition may be a situation in which information regarding the situation inside and outside the vehicle does not meet the display start condition.

In step ST6, by comparing information regarding the situation inside and outside the vehicle acquired by the information acquisition unit 30 with a display change condition stored in the condition DB 31a, the determination unit 31 determines whether or not the information regarding the situation inside and outside the vehicle meets condition information regarding the situation inside and outside the vehicle in the display change condition.

If the determination unit 31 determines that the information regarding the situation inside and outside the vehicle meets the display change condition (step ST6; YES), the determination unit 31 outputs information indicating a display mode after the change corresponding to the display change condition to the control unit 32.

Meanwhile, if the determination unit 31 determines that the information regarding the situation inside and outside the vehicle does not meet the display change condition (step ST6; NO), the process returns to ST4, and the above-described process is repeated.

In a display change condition corresponding to a vehicle state where a door of the vehicle is about to be opened, for example, conditions (1A) to (3A) are set as condition information regarding the situation inside and outside the vehicle.

(1A) After display of display information, a moving object (for example, a pedestrian, a bicycle, or another vehicle) has come close within a first distance range of a door corresponding to the display information (distance range closer than that at the time of start of display of display information).

(2A) After display of display information, a moving object has come close within a second distance range of a door corresponding to the display information (distance range closer than the first distance range).

(3A) After display of display information, a moving object has come close within a third distance range of a door corresponding to the display information (distance range closer than the second distance range).

When the information regarding the situation inside and outside the vehicle meets the conditions (1A) to (3A), the determination unit 31 determines that the information regarding the situation inside and outside the vehicle meets the display change condition corresponding to a vehicle state where a door of the vehicle is about to be opened.

In a display change condition corresponding to a vehicle state where the vehicle is about to move forward or backward, for example, conditions (1B) to (3B) are set as condition information regarding the situation inside and outside the vehicle.

(1B) After display of display information, a moving object (for example, a pedestrian, a bicycle, or another vehicle) has come close within a first distance range in front of or behind the vehicle.

(2B) After display of display information, a moving object has come close within a second distance range in front of or behind the vehicle.

(3B) After display of display information, a moving object has come close within a third distance range in front of or behind the vehicle.

When the information regarding the situation inside and outside the vehicle meets the conditions (1B) to (3B), the determination unit 31 determines that the information regarding the situation inside and outside the vehicle meets the display change condition corresponding to a vehicle state where the vehicle is about to move forward or backward.

In a display change condition corresponding to a vehicle state where the vehicle is about to turn left or right, for example, conditions (1C) to (3C) are set as condition information regarding the situation inside and outside the vehicle.

(1C) After display of display information, a moving object (for example, a pedestrian, a bicycle, or another vehicle) has come close within a first distance range on the right rear or the left rear of the vehicle.

(2C) After display of display information, a moving object has come close within a second distance range on the right rear or the left rear of the vehicle.

(3C) After display of display information, a moving object has come close within a third distance range on the right rear or the left rear of the vehicle.

When the information regarding the situation inside and outside the vehicle meets the conditions (1C) to (3C), the determination unit 31 determines that the information regarding the situation inside and outside the vehicle meets the display change condition corresponding to a vehicle state where the vehicle is about to move forward or backward.

In a display change condition corresponding to a vehicle state where crossing in front of the vehicle is permitted, conditions (1D) to (3D) are set as condition information regarding the situation inside and outside the vehicle.

(1D) After display of display information, a moving object (for example, a pedestrian, a bicycle, or another vehicle) has come close within a first distance range in front of the vehicle.

(2D) After display of display information, a moving object has come close within a second distance range in front of the vehicle.

(3D) After display of display information, a moving object has come close within a third distance range in front of the vehicle.

When the information regarding the situation inside and outside the vehicle meets the conditions (1D) to (3D), the determination unit 31 determines that the information regarding the situation inside and outside the vehicle meets the display change condition corresponding to a vehicle state where the vehicle is about to move forward or backward.

In a display change condition corresponding to a vehicle state where boarding guidance to the vehicle is being provided, conditions (1E) to (3E) are set as condition information regarding the situation inside and outside the vehicle.

(1E) After display of display information, a target person of boarding guidance has come close within a first distance range of a boarding location.

(2E) After display of display information, a moving object has come close within a second distance range of a boarding location of a target person of boarding guidance.

(3E) After display of display information, a moving object has come close within a third distance range of a boarding location of a target person of boarding guidance.

When the information regarding the situation inside and outside the vehicle meets the conditions (1E) to (3E), the determination unit 31 determines that the information regarding the situation inside and outside the vehicle meets the display change condition corresponding to a vehicle state where the vehicle is about to move forward or backward.

Note that an example of the display change condition has been described so far. However, the display change condition may be a condition other than the above-described condition as long as indicating a situation in which the display mode of the display information should be changed.

For example, the control unit 32 changes the display mode of the display information by controlling the light device 4a or the light device 4b on the basis of the information indicating the display mode after the change corresponding to the above display change condition input from the determination unit 31 (step ST7).

When the display information is an animation, the control unit 32 changes at least one of the color, brightness, irradiation position, and irradiation state change speed of the light pattern of the animation.

When the display information is an image, the control unit 32 changes at least one of the shape, color, brightness, size, display position, display timing, and display time of the image.

Note that when the display mode of the display information is changed, the control unit 32 stores the display mode of the display information before the change. The stored display mode is used for a display return process.

A sound may be output outside the vehicle according to the change of the display mode of the display information.

For example, the control unit 32 instructs the overall control ECU 2 to output a sound from an out-of-vehicle speaker according to the change in the display mode of the display information. The overall control ECU 2 outputs a sound from the out-of-vehicle speaker in accordance with an instruction from the control unit 32. The mode of the sound output from the out-of-vehicle speaker may be changed for each display mode after the change. Note that examples of the mode of the sound include a volume, frequency characteristics, a pitch, a tempo, and the position of the out-of-vehicle speaker.

The display change condition collectively includes display information of a vehicle state, condition information regarding the situation inside and outside the vehicle where the display information should be changed, and information indicating a display mode of the display information after the change.

In a display change condition corresponding to a vehicle state where the left rear door of the vehicle 100 is about to be opened, for example, a display mode after the changer for each of the conditions the (1A) to (3A) is associated with the display information 6a illustrated in FIG. 4A and the display information 6b illustrated in FIG. 4B.

The condition (1A) indicates a situation in which a moving object has come close within a first distance range of the left rear door corresponding to the display information 6a after display of the display information 6a or the display information 6b.

The condition (1A) is associated with, for example, a display mode in which the blinking speed of the light pattern of the display information 6a is faster than that before the change, and a display mode in which the text size of the display information 6b is larger than that before the change.

By controlling the light device 4a or the light device 4b on the basis of the display mode after the change corresponding to the condition (1A), the control unit 32 increases the blinking speed of the light pattern of the display information 6a, or increases the text size of the display information 6b.

In the situation indicated by the condition (1A), a moving object such as a pedestrian is closer to the left rear door than at the time of start of display of the display information 6a or the display information 6b.

Therefore, when the situation inside and outside the vehicle meets the condition (1A), the blinking speed of the light pattern of the display information 6a is increased, or the text size of the display information 6b is increased.

As a result, the display information 6a or the display information 6b is emphasized. Therefore, visual recognition by a pedestrian or the like is easier, and the pedestrian or the like can be accurately informed that the left rear door will be opened.

The condition (2A) indicates a situation in which a moving object has come close within a second distance range of the left rear door after display of the display information 6a or the display information 6b. The second distance range is a distance range closer to the door than the first distance range.

The condition (2A) is associated with, for example, a display mode in which the blinking speed of the light pattern of the display information 6a is faster than that in the condition (1A) and the color of the light pattern is a caution color such as yellow, and a display mode in which the text size of the display information 6b is larger than that in the condition (1A) and the character color is a caution color.

By controlling the light device 4a or the light device 4b on the basis of the display mode after the change corresponding to the condition (2A), the control unit 32 increases the blinking speed of the light pattern of the display information 6a and changes the color of the light pattern to a caution color, or increases the text size of the display information 6b and changes the character color to a caution color.

In the situation indicated by the condition (2A), a moving object such as a pedestrian is closer to the left rear door than in the situation indicated by the condition (1A).

Therefore, when the situation inside and outside the vehicle meets the condition (2A), the blinking speed of the light pattern of the display information 6a is increased and the color of the light pattern is changed to a caution color, or the text size of the display information 6b is increased and the character color is changed to a caution color.

As a result, the display information 6a or the display information 6b is further emphasized. Therefore, visual recognition by a pedestrian or the like is easier, and the pedestrian or the like can be accurately informed that the left rear door will be opened.

The condition (3A) indicates a situation in which a moving object has come close within a third distance range of the left rear door after display of the display information 6a or the display information 6b. The third distance range is a distance range closer to the door than the second distance range.

The condition (3A) is associated with, for example, a display mode in which the blinking speed of the light pattern of the display information 6a is faster than that in the condition (2A) and the color of the light pattern is a warning color such as red, and a display mode in which the text size of the display information 6b is larger than that in the condition (2A) and the character color is a warning color.

By controlling the light device 4a or the light device 4b on the basis of the display mode after the change corresponding to the condition (3A), the control unit 32 further increases the blinking speed of the light pattern of the display information 6a and changes the color of the light pattern to a warning color, or further increases the text size of the display information 6b and changes the character color to a warning color.

In the situation indicated by the condition (3A), a moving object such as a pedestrian is closer to the left rear door than in the situation indicated by the condition (2A).

Therefore, when the situation inside and outside the vehicle meets the condition (3A), the blinking speed of the light pattern of the display information 6a is increased and the color of the light pattern is changed to a warning color, or the text size of the display information 6b is increased and the character color is changed to a warning color.

As a result, the display information 6a or the display information 6b is further emphasized. Therefore, visual recognition by a pedestrian or the like is easier, and the pedestrian or the like can be accurately informed that the left rear door will be opened.

Hitherto, the case where the display mode of the display information 6a and 6b for notifying a person outside the vehicle 100 of the vehicle state where the left rear door of the vehicle 100 is about to be opened is changed has been described. However, the control unit 32 may change the display mode similarly also in the display information 7a-1, 7a-2, 7b, 8a, and 8b for notifying a person outside the vehicle of a vehicle state where the vehicle is about to move forward or backward, the display information 9 for notifying a person outside the vehicle of a vehicle state where the vehicle is about to turn left or right, the display information 10a and 10b for notifying a person outside the vehicle of a vehicle state where crossing in front of the vehicle is permitted, and the display information 11a and 11b for notifying a person outside the vehicle of a vehicle state where boarding guidance to the vehicle is being provided. As a result, a target person outside the vehicle can be accurately informed of the vehicle state indicated by the display information.

Hitherto, the display change condition corresponding to a distance (first to third distance ranges) between a moving object (a pedestrian, a bicycle, or another vehicle) outside the vehicle and the vehicle has been described. However, in the first embodiment, a display change condition according to at least one of the position of the moving object around the vehicle, a moving direction, a distance between the vehicle and the moving object, and a moving speed may be set.

For example, the determination unit 31 determines whether or not at least one of the position of the moving object around the vehicle, a moving direction, a distance between the vehicle and the moving object, and a moving speed acquired by the information acquisition unit 30 meets the above display change condition.

When the determination unit 31 determines that at least one of the position of the moving object, a moving direction, a distance between the vehicle and the moving object, and a moving speed meets the above display change condition, the control unit 32 changes the display mode of one or more pieces of display information by controlling the light device 4a or the light device 4b.

Even with such a configuration, the display mode of the display information is changed depending on the situation inside and outside the vehicle, and a target person outside the vehicle can be accurately informed of the display information.

Even after the change of the display mode of the display information, the information acquisition unit 30 acquires information regarding the situation inside and outside the vehicle from the overall control ECU 2 (step ST8). The information regarding the situation inside and outside the vehicle acquired by the information acquisition unit 30 is output to the determination unit 31.

In step ST9, by comparing information regarding the situation inside and outside the vehicle acquired by the information acquisition unit 30 with a display return condition stored in the condition DB 31a, the determination unit 31 determines whether or not the information regarding the situation inside and outside the vehicle meets condition information regarding the situation inside and outside the vehicle in the display return condition.

For example, when an in-vehicle sensor (for example, the door knob sensor 1t) does not react during display of the display information (animation) of a vehicle state where a door of the vehicle is about to be opened, the display mode of the animation is changed (the intensity of the display is weakened). When the in-vehicle sensor reacts again and returns the display, the animation is blinked (returns the display by strongly attracting attention).

If the determination unit 31 determines that the information regarding the situation inside and outside the vehicle does not meet the display return condition (step ST9; NO), the process returns to step ST8. As a result, the above-described process is repeated.

Meanwhile, if the determination unit 31 determines that the information regarding the situation inside and outside the vehicle meets the display return condition (step ST9; YES), the determination unit 31 outputs information indicating the determination result to the control unit 32. When the determination unit 31 determines that the information regarding the situation inside and outside the vehicle meets the display return condition, the control unit 32 returns the display mode of the display information to the original mode by controlling the light device 4a or the light device 4b (step ST10). As a result, the display information is displayed outside the vehicle in the display mode before the change. Thereafter, the process returns to step ST4, and the above-described series of processes is repeated until the situation inside and outside the vehicle meets a display end condition.

Note that for example, when blinking of the animation occurs once every 2 seconds in step ST3, and blinking of the animation occurs once per second in step ST7, operation of blinking the animation twice per second is performed after the process of step ST10 is completed and before the process returns to the display of step ST3. That is, a process for making a display mode different from those in steps ST3 and ST7 may be added. This blinking operation is an example, and can be set freely.

For example, as a display return condition of the display information 6a, a situation (a) in which a moving object goes away from the left rear door and goes outside a first distance range, a situation (b) in which a moving object goes away from the left rear door and goes outside a second distance range, and a situation (c) in which a moving object goes away from the left rear door and goes outside a third distance range are set. When the determination unit 31 determines that the situation inside and outside the vehicle meets the condition (c) as a display return condition, the control unit 32 returns the display mode of the display information 6a or the display information 6b to the state before the change based on the condition (3A) by controlling the light device 4a or the light device 4b. As a result, the blinking speed of the light pattern of the display information 6a returns to that before the change, and the color of the light pattern also returns from the warning color to the caution color. The text size of the display information 6b returns to that before the change, and the character color also returns from the warning color to the caution color.

When the determination unit 31 determines that the situation inside and outside the vehicle meets the condition (b) as a display return condition, the control unit 32 returns the display mode of the display information 6a or the display information 6b to the state before the change based on the condition (2A) by controlling the light device 4a or the light device 4b. As a result, the blinking speed of the light pattern of the display information 6a returns to that before the change, and the color of the light pattern also returns from the caution color to the color at the time of start of the display of the display information 6a. The text size of the display information 6b returns to that before the change, and the character color also returns from the caution color to the color at the time of start of the display of the display information 6b.

When the determination unit 31 determines that the situation inside and outside the vehicle meets the condition (a) as a display return condition, the control unit 32 returns the display mode of the display information 6a or the display information 6b to the state before the change based on the condition (1A) by controlling the light device 4a or the light device 4b. As a result, the blinking speed of the light pattern of the display information 6a returns to that at the time of start of the display of the display information 6a. The text size of the display information 6b returns to that at the time of start of the display of the display information 6b.

When the process of step ST10 is completed, the process returns to step ST4 and the above-described process is repeated. In the above-described process, if the determination unit 31 determines that the information regarding the situation inside and outside the vehicle meets the above display end condition (step ST5; YES), the control unit 32 ends the display of the display information by controlling the light device 4a or the light device 4b (step ST11). As a result, a series of processes illustrated in FIG. 3 ends.

When there is a plurality of sensing areas around the vehicle by a plurality of the out-of-vehicle sensors 1r disposed in the vehicle, display information may be displayed depending on a detection situation of a moving object in these sensing areas, and a display mode may be changed.

Figure 10A:
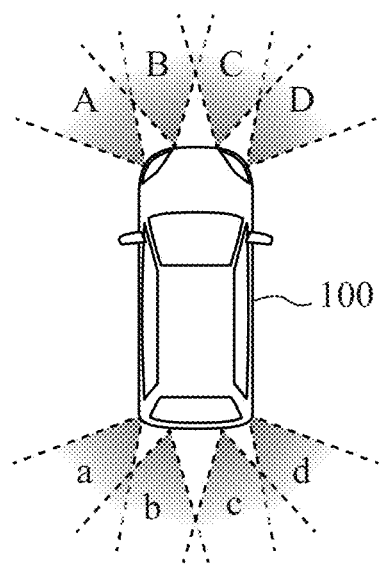
FIG. 10A is a diagram illustrating sensing areas of a plurality of out-of-vehicle sensors.
Figure 10B:
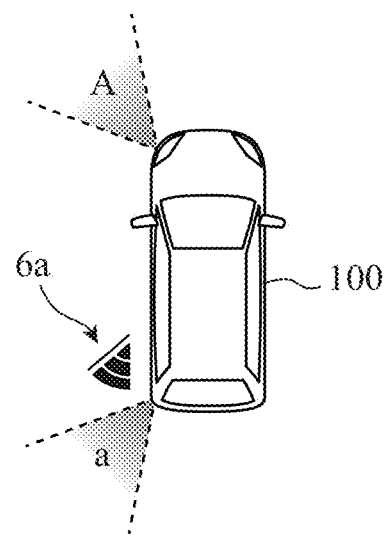
FIG. 10B is a diagram illustrating an attentional sensing area in a vehicle state where the left rear door of a vehicle is about to be opened among the sensing areas of FIG. 10A.

FIG. 10A is a diagram illustrating sensing areas of the plurality of out-of-vehicle sensors 1r, and illustrates the vehicle 100 viewed from above. FIG. 10B is a diagram illustrating an attentional sensing area in a vehicle state where the left rear door of the vehicle 100 is about to be opened among the sensing areas of FIG. 10A, and illustrates the vehicle 100 viewed from above.

As illustrated in FIG. 10A, sensing areas A to D are in front of the vehicle 100, and sensing areas a to d are behind the vehicle 100.

Examples of the out-of-vehicle sensor 1r include a corner sensor disposed in the vehicle 100. However, the out-of-vehicle sensor 1r may be a LiDAR sensor, and the sensing areas A to D and a to d may be achieved by the out-of-vehicle camera 1q instead of the out-of-vehicle sensor 1r.

A situation where a moving object (a pedestrian or a bicycle) has been detected in the sensing area A may be set as a display start condition of the display information 6a. A situation where the moving object has been detected in the sensing area a may be set as a display change condition of the display information 6a. A situation where the moving object has not been detected in the sensing area a for a certain time may be set as a display return condition of the display information 6a.

When a pedestrian is detected in the sensing area A, the determination unit 31 determines that the situation inside and outside the vehicle meets the display start condition. When the determination unit 31 determines that the situation inside and outside the vehicle meets the display start condition, the control unit 32 starts displaying the display information 6a as illustrated in FIG. 10B.

When a pedestrian is detected in the sensing area a after display of the display information 6a, the determination unit 31 determines that the situation inside and outside the vehicle meets the display change condition. When the determination unit 31 determines that the situation inside and outside the vehicle meets the display change condition, the control unit 32 changes the display mode of the display information 6a.

When a pedestrian has not been detected in the sensing area a for a certain time after change of the display mode of the display information 6a, the determination unit 31 determines that the situation inside and outside the vehicle meets the display return condition. When the determination unit 31 determines that the situation inside and outside the vehicle meets the display return condition, the control unit 32 returns the display mode of the display information 6a to the mode before the change.

A situation where the moving object has been detected in the sensing area a may be set as a display start condition of the display information 6a, and a situation where the moving object has not been detected in the sensing area a for a certain time may be set as a display end condition of the display information 6a.

When a pedestrian is detected in the sensing area a, the determination unit 31 determines that the situation inside and outside the vehicle meets the display start condition. When the determination unit 31 determines that the situation inside and outside the vehicle meets the display start condition, the control unit 32 starts displaying the display information 6a as illustrated in FIG. 10B.

When a pedestrian has not been detected in the sensing area a for a certain time, the determination unit 31 determines that the situation inside and outside the vehicle meets the display end condition. When the determination unit 31 determines that the situation inside and outside the vehicle meets the display end condition, the control unit 32 ends the display of the display information 6a.

A situation where the moving object has been detected in the sensing area a may be set as a display start condition of the display information 6a, and a situation where the moving object has been detected in the sensing area A may be set as a display end condition of the display information 6a.

When a pedestrian is detected in the sensing area a, the determination unit 31 determines that the situation inside and outside the vehicle meets the display start condition. When the determination unit 31 determines that the situation inside and outside the vehicle meets the display start condition, the control unit 32 starts display of the display information 6a.

When the pedestrian moves and is detected in the sensing area A, the determination unit 31 determines that the situation inside and outside the vehicle meets the display end condition. When the determination unit 31 determines that the situation inside and outside the vehicle meets the display end condition, the control unit 32 ends the display of the display information 6a.

Note that the display information 6a for notifying a person outside the vehicle of a vehicle state where the left rear door of is about to be opened has been described so far. However, also for the display information 6b, start of display, change of a display mode, return of the display mode, and end of display may be performed similarly.

Also for the display information 7a-1, 7a-2, 7b, 8a, and 8b for notifying a person outside the vehicle of a vehicle state where the vehicle is about to move forward or backward, the display information 9 for notifying a person outside the vehicle of a vehicle state where the vehicle is about to turn left or right, the display information 10a and 10b for notifying a person outside the vehicle of a vehicle state where crossing in front of the vehicle is permitted, and the display information 11a and 11b for notifying a person outside the vehicle of a vehicle state where boarding guidance to the vehicle is being provided, start of display, change of a display mode, return of the display mode, and end of display may be performed similarly.

A situation where the illuminance around the vehicle exceeds a threshold may be set as a display change condition of display information, and a situation where the illuminance around the vehicle becomes equal to or lower than the above threshold and a certain time has elapsed may be set as a display return condition of display information.

For example, when the illuminance sensor 1s detects that the illuminance around the vehicle has exceeded a threshold after display of display information, the determination unit 31 determines that the situation inside and outside the vehicle meets the display change condition. When the determination unit 31 determines that the situation inside and outside the vehicle meets the display change condition, the control unit 32 changes the display mode of display information.

In the display mode after the change, display information can be visually recognized even at an illuminance exceeding the threshold. For example, when the display information is an animation, the color or brightness of the light pattern is changed in such a manner that the animation can be visually recognized even at an illuminance exceeding the threshold. When the display information is an image, the shape, color, brightness, and size of the image are changed in such a manner that the image can be visually recognized even at an illuminance exceeding the threshold.

When the illuminance sensor 1s detects that the illuminance around the vehicle has become equal to or lower than the threshold and a certain time has elapsed after change of the display mode of the display information, the determination unit 31 determines that the situation inside and outside the vehicle meets the display return condition.

When the determination unit 31 determines that the situation inside and outside the vehicle meets the display return condition, the control unit 32 returns the display mode of display information to the mode before the change.

A plurality of pieces of display information may be displayed at a plurality of locations outside the vehicle depending on the situation inside and outside the vehicle.

For example, by adding display information of a new vehicle state depending on the situation inside and outside the vehicle in addition to the display information for notification of a vehicle state where a door will be opened, attention is attracted more accurately. As a result, for example, even when there are one or two pedestrians, attention can be attracted appropriately.

Figure 11:
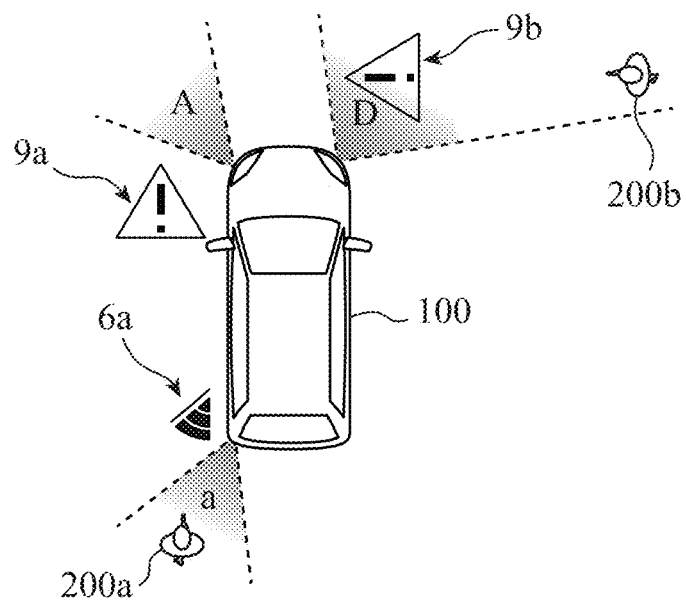
FIG. 11 is a diagram illustrating an example of a plurality of pieces of display information for notifying a person outside a vehicle of a vehicle state where the left rear door is about to be opened.

FIG. 11 is a diagram illustrating a plurality of pieces of display information for notifying a person outside the vehicle of a vehicle state where the left rear door is about to be opened, and illustrates the vehicle 100 viewed from above. In FIG. 11, sensing areas A to D are in front of the vehicle 100, and sensing areas a to d are behind the vehicle 100 as in FIG. 10A.

For example, as a display start condition (a) of the display information 6a for notifying a person outside the vehicle of a vehicle state where the left rear door is about to be opened, a situation in which a moving object (a pedestrian, a bicycle, or another vehicle) has been detected in the sensing area a is set.

As a display start condition (b) of display information 9b for attracting attention of a moving object approaching the vehicle 100 from the right front thereof to a moving object moving from the rear of the vehicle 100 to the left front thereof, a situation in which a moving object has been detected in the sensing area D and a moving object has been detected in the sensing area a or the sensing area A is set.

Similarly, as a display start condition (c) of display information 9a for attracting attention of a moving object moving from the rear of the vehicle 100 to the left front thereof to a moving object approaching the vehicle 100 from the right front thereof, a situation in which a moving object has been detected in the sensing area a or the sensing area A and a moving object has been detected in the sensing area D is set.

When a pedestrian 200a is detected in the sensing area a, the determination unit 31 determines that the situation inside and outside the vehicle meets the display start condition (a). When the determination unit 31 determines that the situation inside and outside the vehicle meets the display start condition (a), the control unit 32 starts displaying the display information 6a as illustrated in FIG. 11.

Meanwhile, when the pedestrian 200a is detected in the sensing area a or the sensing area A and a pedestrian 200b is further detected in the sensing area D, the pedestrian 200a and the pedestrian 200b may collide with each other as they encounter.

Therefore, when the pedestrian 200a is detected in the sensing area a or the sensing area A and the pedestrian 200b is detected in the sensing area D, the determination unit 31 determines that the situation inside and outside the vehicle meets the display start conditions (b) and (c). When the determination unit 31 determines that the situation inside and outside the vehicle meets the display start conditions (b) and (c), the control unit 32 starts display of the display information 9a and the display information 9b as illustrated in FIG. 11.

As a result, attention of the pedestrian 200a is attracted to the pedestrian 200b by the display information 9a, and attention of the pedestrian 200b is attracted to the pedestrian 200a by the display information 9b.

The display modes of the plurality of pieces of display information may be changed depending on a moving situation between moving objects existing around the vehicle.

For example, as a display change condition of the display information 9a, a situation in which approach of a moving object within a certain distance range of the vehicle 100 has been detected in the sensing area D is set.

As a display change condition of the display information 9b, a situation in which a moving object has been detected in the sensing area A after detection of a moving object in the sensing area a is set.

When the pedestrian 200a is detected in the sensing area A after detection of approach of the pedestrian 200b within a certain distance range of the vehicle 100 in the sensing area D and detection of the pedestrian 200a in the sensing area a, it is expected that the pedestrian 200a and the pedestrian 200b are coming closer to each other.

When the determination unit 31 determines that the situation inside and outside the vehicle meets the display change condition, the control unit 32 changes the display modes of the display information 9a and the display information 9b to more emphasized ones. As a result, attention of the pedestrian 200a can be accurately attracted to the pedestrian 200b, and attention of the pedestrian 200b can be accurately attracted to the pedestrian 200a.

Figure 12A:
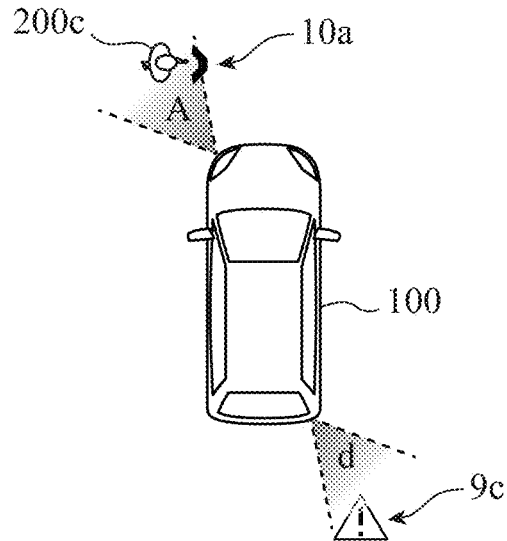
FIG. 12A is a diagram illustrating an example of display information for notifying a person outside a vehicle of a vehicle state where crossing in front of the vehicle is permitted.
Figure 12B:
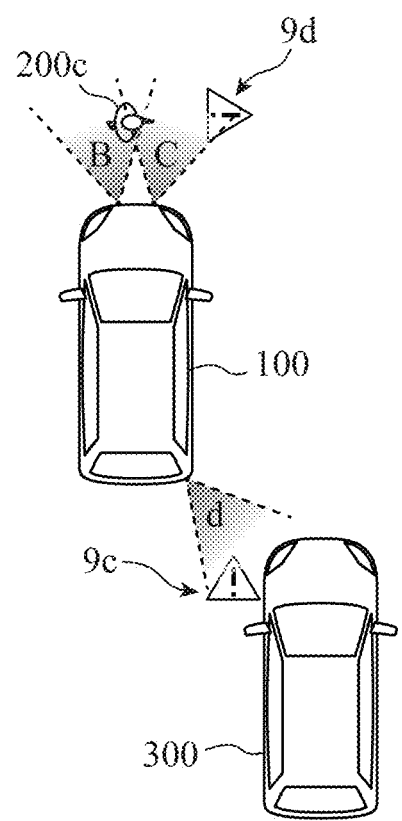
FIG. 12B is a diagram illustrating an example of display information for attracting attention of both a pedestrian and a newly approaching vehicle.

FIG. 12A is a diagram illustrating display information 10a for notifying a person outside the vehicle 100 of a vehicle state where crossing in front of the vehicle 100 is permitted, and illustrates the vehicle 100 viewed from above. FIG. 12B is a diagram illustrating display information 9d and 9c for attracting attention of both a pedestrian 200c and a newly approaching vehicle 300, and illustrates the vehicle 100 viewed from above.

In FIGS. 12A and 12B, sensing areas A to D are in front of the vehicle 100, and sensing areas a to d are behind the vehicle 100 as in FIG. 10A.

For example, as a display start condition (a1) of the display information 10a for notifying a person outside the vehicle of a vehicle state where crossing in front of the vehicle is permitted, a situation in which a moving object (a pedestrian, a bicycle, or another vehicle) has been detected in the sensing area A is set.

As a display start condition (b1) of display information 9c for attracting attention of a moving object moving from the rear of the vehicle 100 to the right front thereof to a moving object moving from the left of the vehicle 100 to the right front thereof, a situation in which a moving object has been detected in the sensing area d and a moving object has been detected in the sensing area C is set.

As a display start condition (c1) of display information 9d for attracting attention of a moving object moving from the left of the vehicle 100 to the right front thereof to a moving object moving from the rear of the vehicle 100 to the right front thereof, a situation in which a moving object has been detected in the sensing area C and a moving object has been detected in the sensing area d is set.

When the pedestrian 200c is detected in the sensing area A, the determination unit 31 determines that the situation inside and outside the vehicle meets the display start condition (a1).

When the determination unit 31 determines that the situation inside and outside the vehicle meets the display start condition (a1), the control unit 32 starts displaying the display information 10a as illustrated in FIG. 12A.

Meanwhile, when the pedestrian 200c is detected in the sensing area C and the vehicle 300 is further detected in the sensing area d, the pedestrian 200c and the vehicle 300 may collide with each other.

Therefore, when the pedestrian 200c is detected in the sensing area C and the vehicle 300 is detected in the sensing area d, the determination unit 31 determines that the situation inside and outside the vehicle meets the display start conditions (b1) and (c1).

When the determination unit 31 determines that the situation inside and outside the vehicle meets the display start conditions (b1) and (c1), the control unit 32 starts display of the display information 9c and the display information 9d as illustrated in FIG. 11. As a result, attention of a driver of the vehicle 300 is attracted to the pedestrian 200c by the display information 9c, and attention of the pedestrian 200c is attracted to the vehicle 300 by the display information 9d.

For example, as a display change condition of the display information 9d, a situation in which approach of a moving object within a certain distance range of the vehicle 100 has been detected in the sensing area d is set.

When it is detected that the vehicle 300 has come close within a certain distance range of the vehicle 100 in the sensing area d, it is expected that the pedestrian 200c and the vehicle 300 are coming closer to each other.

When the determination unit 31 determines that the situation inside and outside the vehicle meets the above display change condition, the control unit 32 changes the display mode of the display information 9d to a more emphasized one.

As a result, attention of the pedestrian 200c can be more accurately attracted to the approach of the vehicle 300.

When there is a plurality of sensing areas around the vehicle, the irradiation apparatus 3 according to the first embodiment may change the display position of display information depending on a detection situation of a moving object in these sensing areas.

Figure 13A:
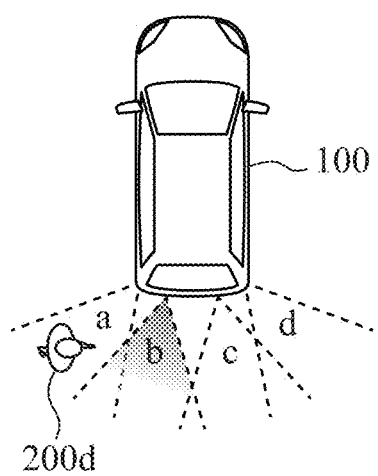
FIG. 13A is a diagram illustrating an attentional sensing area in a vehicle state where a vehicle is about to move backward among a plurality of sensing areas.
Figure 13B:
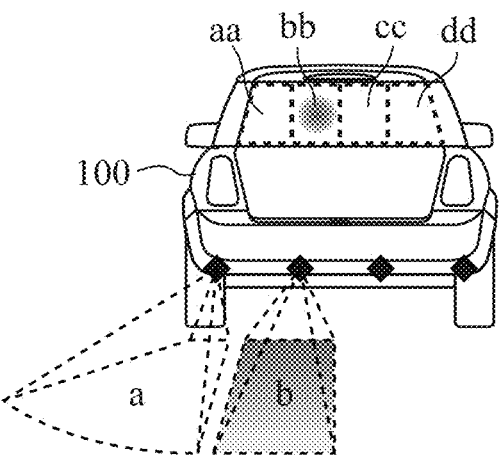
FIG. 13B is a diagram illustrating how the display position of display information is changed depending on movement of a pedestrian behind a vehicle.

FIG. 13A is a diagram illustrating an attentional sensing area in a vehicle state where the vehicle 100 is about to move backward among a plurality of sensing areas, and illustrates the vehicle 100 viewed from above. FIG. 13B is a diagram illustrating how the display position of display information is changed depending on movement of a pedestrian behind the vehicle, and illustrates the vehicle 100 viewed from the rear side.

In FIGS. 13A and 13B, sensing areas A to D are in front of the vehicle 100, and sensing areas a to d are behind the vehicle 100 as in FIG. 10A.

The light 4a2 illustrated in FIG. 1 displays display information in areas on a road surface corresponding to each of the sensing areas a to d behind the vehicle 100 illustrated in FIGS. 13A and 13B.

The light 4b2 illustrated in FIG. 1 displays display information in each of areas aa, bb, cc, and dd of the rear window of the vehicle 100.

Note that the rear window area aa corresponds to the sensing area a, the rear window area bb corresponds to the sensing area b, the rear window area cc corresponds to the sensing area c, and the rear window area dd corresponds to the sensing area d.

For example, as a display start condition of display information for notifying a person outside the vehicle 100 of a vehicle state where the vehicle 100 is about to move backward, a situation in which a moving object (a pedestrian, a bicycle, or another vehicle) has been detected in the sensing areas a to d is set.

When a pedestrian 200d is detected in the sensing area a, the determination unit 31 determines that the situation inside and outside the vehicle meets the above display start condition.

When the determination unit 31 determines that the situation inside and outside the vehicle meets the display start condition, the control unit 32 specifies the sensing area b adjacent to the sensing area a where the pedestrian 200d has been detected (adjacent sensing area in the moving direction of the pedestrian 200d).

The control unit 32 starts display of display information in an area on a road surface corresponding to the specified sensing area b by controlling the light device 4a as illustrated in FIG. 13B.

The control unit 32 may start display of display information in the area bb of the rear window corresponding to the sensing area b by controlling the light device 4b as illustrated in FIG. 13B.

For example, as a display change condition of display information, a situation in which a moving object has been detected in a sensing area adjacent to the sensing area where a moving object has been detected at the time of display of the display information among the sensing areas a to d is set.

When the pedestrian 200d is detected in the sensing area b following the sensing area a, the determination unit 31 determines that the situation inside and outside the vehicle meets the display change condition.

When the determination unit 31 determines that the situation inside and outside the vehicle meets the display change condition, the control unit 32 specifies the sensing area c adjacent to the sensing area b where the pedestrian 200d has been detected (adjacent sensing area in the moving direction of the pedestrian 200d).

The control unit 32 changes the display position of display information to an area on a road surface corresponding to the specified sensing area c by controlling the light device 4a.

The control unit 32 may change the display position of display information to the area cc of the rear window corresponding to the sensing area c by controlling the light device 4b.

As described above, the display position of display information is changed depending on a detection situation of a moving object in the plurality of sensing areas.

As a display return condition of display information, a situation in which a moving object has been detected again in a sensing area where a moving object has been detected among the sensing areas a to d may be set.

For example, when the pedestrian 200d is detected again in the sensing area b following the sensing area c, the determination unit 31 determines that the situation inside and outside the vehicle meets the display return condition.

When the determination unit 31 determines that the situation inside and outside the vehicle meets the display return condition, the control unit 32 specifies the sensing area a adjacent to the sensing area b where the pedestrian 200d has been detected (adjacent sensing area in the moving direction of the pedestrian 200d).

The control unit 32 changes the display position of display information to an area on a road surface corresponding to the specified sensing area a by controlling the light device 4a.

The control unit 32 may change the display position of display information to the area aa of the rear window corresponding to the sensing area a by controlling the light device 4b.

As described above, the display position of display information is returned to the position before the change depending on a detection situation of a moving object in the plurality of sensing areas. As a result, attention can be attracted appropriately depending on a detection situation of a moving object.

The irradiation apparatus 3 according to the first embodiment may change the display position of display information depending on the moving speed of a moving object around the vehicle, the moving direction thereof, and a distance between the moving object and the vehicle.

Figure 14A:
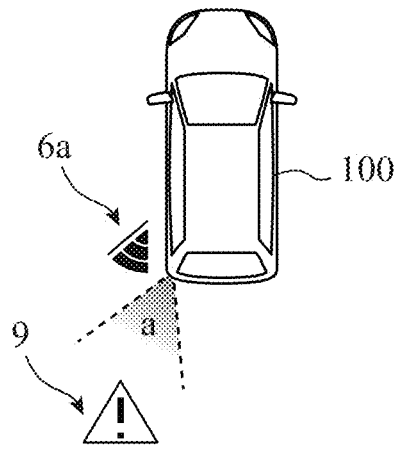
FIG. 14A is a diagram illustrating an example of display information for a pedestrian close to a vehicle.
Figure 14A:
Figure 14B:
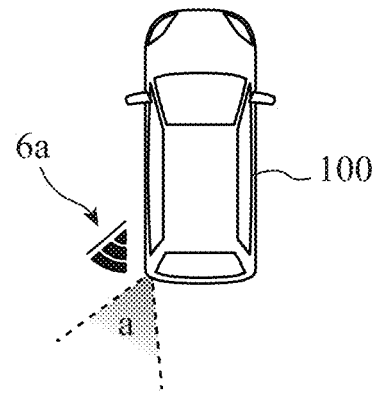
FIG. 14B is a diagram illustrating an example of display information for a bicycle far from a vehicle.
Figure 14B:
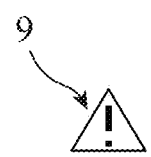

FIG. 14A is a diagram illustrating an example of display information for a pedestrian 200e close to the vehicle 100, and illustrates the vehicle 100 viewed from above. FIG. 14B is a diagram illustrating an example of display information for a bicycle far from the vehicle 100, and illustrates the vehicle 100 viewed from above. In FIGS. 14A and 14B, sensing areas A to D are in front of the vehicle 100, and sensing areas a to d are behind the vehicle 100 as in FIG. 10A.

For example, as a display start condition of the display information 9 for attracting attention to the left rear door of the vehicle 100, a situation in which the display information 6a corresponding to a vehicle state where the left rear door is about to be opened is displayed and a moving object around the vehicle has been detected in the sensing area a is set.

As a display change condition of the display information 9, a situation in which the vehicle 100 exists in the moving direction of a moving object detected in the sensing area a and existing around the vehicle, the moving speed of the moving object is one of a plurality of speed ranges, and a distance between the moving object and the vehicle 100 is one of a plurality of distance ranges is set.

When a pedestrian 200e or a bicycle 200f is detected in the sensing area a after display of the display information 6a, the determination unit 31 determines that the situation inside and outside the vehicle meets the display start condition. At this time, in addition to the display information 9 corresponding to the display start condition, the determination unit 31 outputs the moving direction of the pedestrian 200e or the bicycle 200f, the moving speed thereof, and a distance between the vehicle 100 and the pedestrian 200e or the bicycle 200f, acquired by the information acquisition unit 30 to the control unit 32.

When the determination unit 31 determines that the situation inside and outside the vehicle meets the display start condition, the control unit 32 specifies the position of the pedestrian 200e or the bicycle 200f on the basis of the moving direction of the pedestrian 200e or the bicycle 200f, the moving speed thereof, and a distance between the vehicle 100 and the pedestrian 200e or the bicycle 200f.

The control unit 32 starts display of the display information 9 near the specified position of the pedestrian 200e or the bicycle 200f by controlling the light device 4a.

After display of the display information 9, when the vehicle 100 exists in the moving direction of the pedestrian 200e, the moving speed of the pedestrian 200e is one of a plurality of speed ranges, and a distance between the pedestrian 200e and the vehicle 100 is one of a plurality of distance ranges, the determination unit 31 determines that the situation inside and outside the vehicle meets the display change condition. At this time, the determination unit 31 outputs the moving direction of the pedestrian 200e, the moving speed thereof, and a distance between the vehicle 100 and the pedestrian 200e, acquired by the information acquisition unit 30 to the control unit 32.

When the determination unit 31 determines that the situation inside and outside the vehicle meets the display change condition, the control unit 32 specifies the position of the pedestrian 200e on the basis of the moving direction of the pedestrian 200e, the moving speed thereof, and a distance between the vehicle 100 and the pedestrian 200e.

The control unit 32 changes the display position of the display information 9 near the specified position of the pedestrian 200e by controlling the light device 4a as illustrated in FIG. 14A.

As described above, by displaying the display information 9 depending on the moving speed of the pedestrian 200e, the moving direction thereof, and a distance between the vehicle 100 and the pedestrian 200e, attention of the pedestrian 200e can be accurately attracted to opening of the left rear door of the vehicle 100.

After display of the display information 9, when the vehicle 100 exists in the moving direction of the bicycle 200f, the moving speed of the bicycle 200f is one of a plurality of speed ranges, and a distance between the bicycle 200f and the vehicle 100 is one of a plurality of distance ranges, the determination unit 31 determines that the situation inside and outside the vehicle meets the display change condition. At this time, the determination unit 31 outputs the moving direction of the bicycle 200f, the moving speed thereof, and a distance between the vehicle 100 and the bicycle 200f, acquired by the information acquisition unit 30 to the control unit 32.

When the determination unit 31 determines that the situation inside and outside the vehicle meets the display change condition, the control unit 32 specifies the position of the bicycle 200f on the basis of the moving direction of the bicycle 200f, the moving speed thereof, and a distance between the vehicle 100 and the bicycle 200f.

The control unit 32 changes the display position of the display information 9 near the specified position of the bicycle 200f by controlling the light device 4a as illustrated in FIG. 14B.

As described above, by displaying the display information 9 depending on the moving speed of the bicycle 200f, the moving direction thereof, and a distance between the vehicle 100 and the bicycle 200f, attention of an occupant of bicycle 200f can be accurately attracted to opening of the left rear door of the vehicle 100.

The case where attention is attracted to the vehicle state where a door of the vehicle 100 is about to be opened by changing the display position of display information depending on the moving speed of a moving object around the vehicle, the moving direction thereof, and a distance between the moving object and the vehicle has been described. However, limitation thereto is not intended.

For example, similarly by changing the display position of display information, attention may be attracted to a vehicle state where the vehicle is about to move forward or backward, a vehicle state where the vehicle is about to turn right or left, a vehicle state where crossing in front of the vehicle is permitted, a vehicle state where boarding guidance to the vehicle is being provided, and a vehicle state where attention of a pedestrian around the vehicle is attracted.

Figure 15:
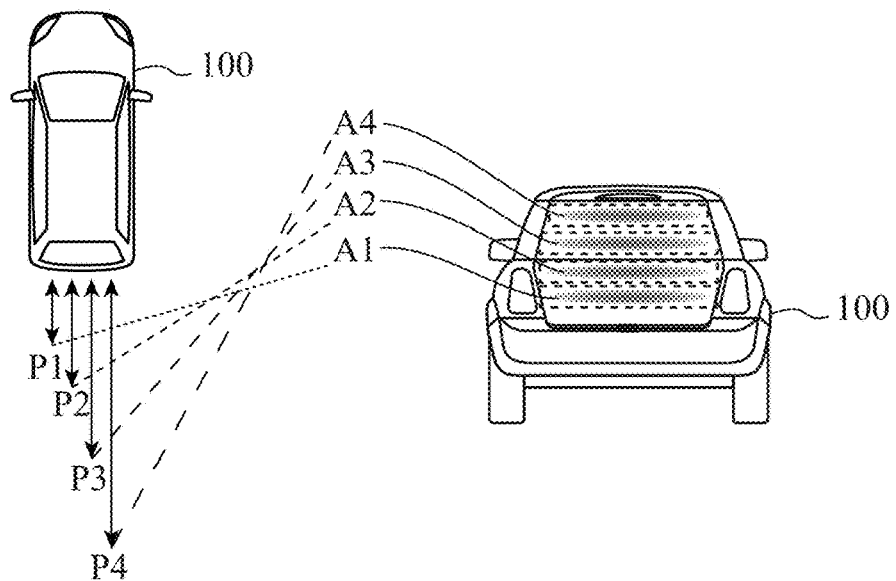
FIG. 15 is a diagram illustrating how the display position of display information is changed depending on a distance from a vehicle to a target person outside the vehicle.

FIG. 15 is a diagram illustrating how the display position of display information is changed depending on a distance from the vehicle 100 to a target person outside the vehicle. The light 4b2 illustrated in FIG. 1 may be able to display information in each of the plurality of display areas A1 to A4 of the rear window of the vehicle 100 as illustrated on the right side of FIG. 15.

As illustrated on the right side of FIG. 15, the display area A1 is at the lowest position of the rear window of the vehicle 100, and corresponds to a distance P1 that is the closest to the vehicle 100.

The display area A2 is at the second lowest position of the rear window of the vehicle 100, and corresponds to a distance P2 that is the second closest to the vehicle 100.

The display area A4 is at the highest position of the rear window of the vehicle 100, and corresponds to a distance P4 that is the farthest from the vehicle 100.

The display area A3 is at the second highest position of the rear window of the vehicle 100, and corresponds to a distance P3 that is the second farthest from the vehicle 100.

For example, when the determination unit 31 determines that the situation inside and outside the vehicle meets a display start condition of certain display information, in addition to the display information corresponding to the display start condition, the determination unit 31 outputs the moving direction of a moving object (a pedestrian or the like) around the vehicle, the moving speed thereof, and a distance between the moving object and the vehicle 100, acquired by the information acquisition unit 30 to the control unit 32.

When the determination unit 31 determines that the situation inside and outside the vehicle meets the display start condition, the control unit 32 specifies the position of the moving object on the basis of the moving direction of the moving object, the moving speed thereof, and a distance between the vehicle 100 and the moving object. The control unit 32 starts display of display information in a display area corresponding to the specified position of the moving object among the display areas A1 to A4 of the rear window by controlling the light device 4b.

As a display change condition of the display information, a situation in which a moving object around the vehicle is approaching the vehicle 100 may be set.

For example, when it is detected that the moving object around the vehicle is approaching the vehicle 100 after display of the above display information, the determination unit 31 determines that the situation inside and outside the vehicle meets the display change condition. At this time, the determination unit 31 outputs the moving direction of the moving object, the moving speed thereof, and a distance between the vehicle 100 and the moving object, acquired by the information acquisition unit 30 to the control unit 32.

When the determination unit 31 determines that the situation inside and outside the vehicle meets the display change condition, the control unit 32 specifies the position of the moving object on the basis of the moving direction of the moving object, the moving speed thereof, and a distance between the vehicle 100 and the moving object. The control unit 32 changes the display position of display information to a display area corresponding to the specified position of the moving object among the display areas A1 to A4 of the rear window by controlling the light device 4b.

As described above, the display position of display information is changed depending on a distance from the vehicle 100 to a target person outside the vehicle, and therefore the target person outside the vehicle can visually recognize the display information easily. In FIG. 15, the display information is displayed at a high position on the rear window in such a manner that a target person who is far from the vehicle 100 can visually recognize the display information easily.

As described above, in the irradiation apparatus 3 according to the first embodiment, when information regarding the situation inside and outside the vehicle is determined to match a display change condition, the control unit 32 changes the display mode of the information displayed outside the vehicle by controlling the light device 4a or the light device 4b. As a result, information can be displayed in a display mode according to the situation inside and outside the vehicle, and a target person outside the vehicle can be accurately informed of the information displayed outside the vehicle.

Second Embodiment

In a second embodiment, a configuration in which a person in a vehicle is notified of information displayed outside the vehicle will be described.

The configuration of an irradiation apparatus according to the second embodiment is basically the same as the configuration illustrated in FIGS. 1 and 2 of the first embodiment. Therefore, also in the second embodiment, FIG. 1 is referred to for a hardware configuration, and FIG. 2 is referred to for a functional configuration.

Next, the operation will be described.

Figure 16:
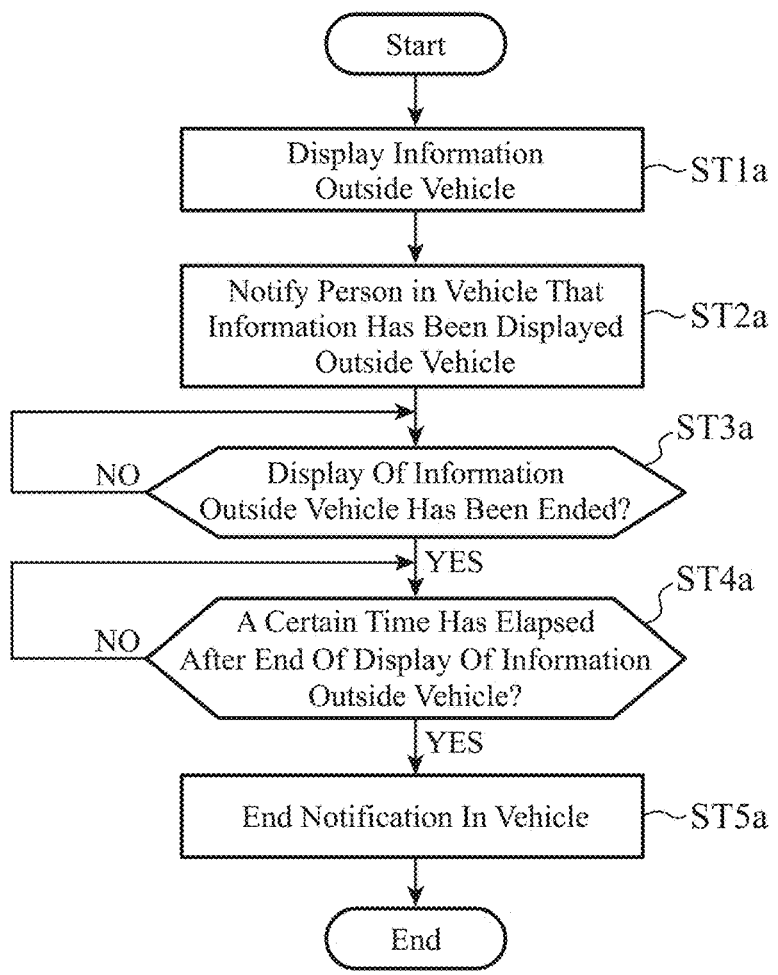
FIG. 16 is a flowchart illustrating operation of an irradiation apparatus according to a second embodiment of the present invention.

FIG. 16 is a flowchart illustrating operation of an irradiation apparatus 3 according to the second embodiment of the present invention. First, similar to the first embodiment, the control unit 32 displays information outside a vehicle by controlling a light device 4a or a light device 4b (step ST1a).

Subsequently, the control unit 32 notifies a person in the vehicle that information has been displayed outside the vehicle by controlling at least one of the light device 4c and an in-vehicle monitor 2i (step ST2a).

Figure 17:
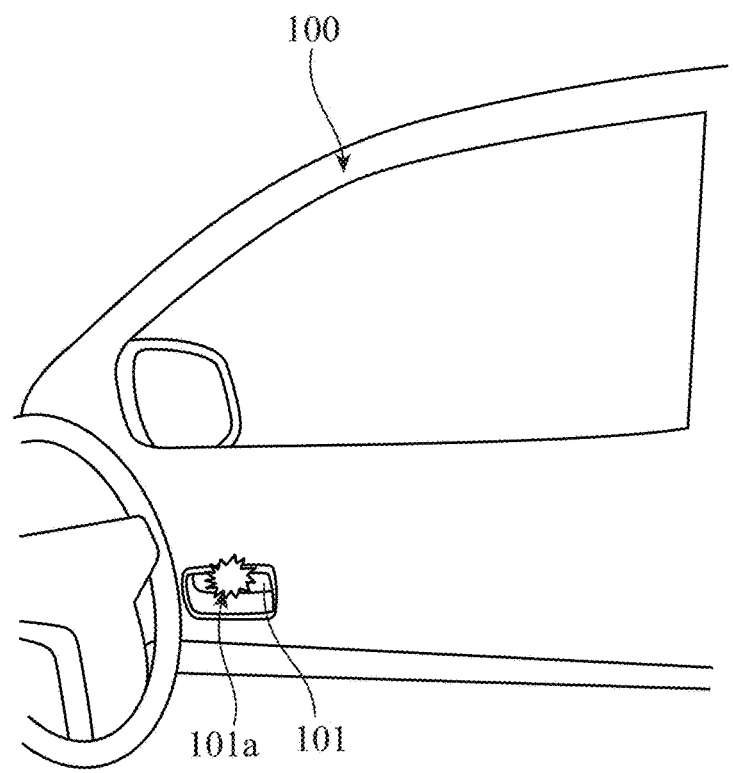
FIG. 17 is a diagram illustrating a lighting state of a door knob lamp in the second embodiment.

FIG. 17 is a diagram illustrating a lighting state of a door knob lamp 101a in the second embodiment, and illustrates the interior of a vehicle 100. The vehicle 100 includes a door knob lamp 101a that is the light 4c2 illustrated in FIG. 1. The door knob lamp 101a is an in-vehicle lamp for emitting light in the vehicle and illuminates a door knob 101 inside the vehicle.

The irradiation apparatus 3 according to the second embodiment lights the door knob lamp 101a in response to display of display information indicating a vehicle state where a door having the door knob 101 is about to be opened outside the vehicle.

For example, when a determination unit 31 determines that the situation inside and outside the vehicle meets a display start condition of the above display information, the control unit 32 of the irradiation apparatus 3 instructs a light driver 4c1 to light the door knob lamp 101a of the door that is about to be opened. As a result, the light driver 4c1 lights the door knob lamp 101a in accordance with the instruction from the control unit 32.

Note that the light emitted from the door knob lamp 101a may be blinked.

An occupant of the vehicle can confirm that the display information regarding opening the door is displayed outside the vehicle by visually recognizing a lighting state of the door knob lamp 101a.

That is, the occupant can determine an action to be performed next after confirming the situation where the display information attracts attention of a person outside the vehicle to opening the door.

Note that the case where the door knob lamp 101a is lit has been described, but the in-vehicle lamp that is lit according to the display of the display information is not limited to the door knob lamp 101a.

The same effect can be obtained with an in-vehicle lamp disposed in a place that falls within the field of view of the occupant trying to open the door.

Figure 18:
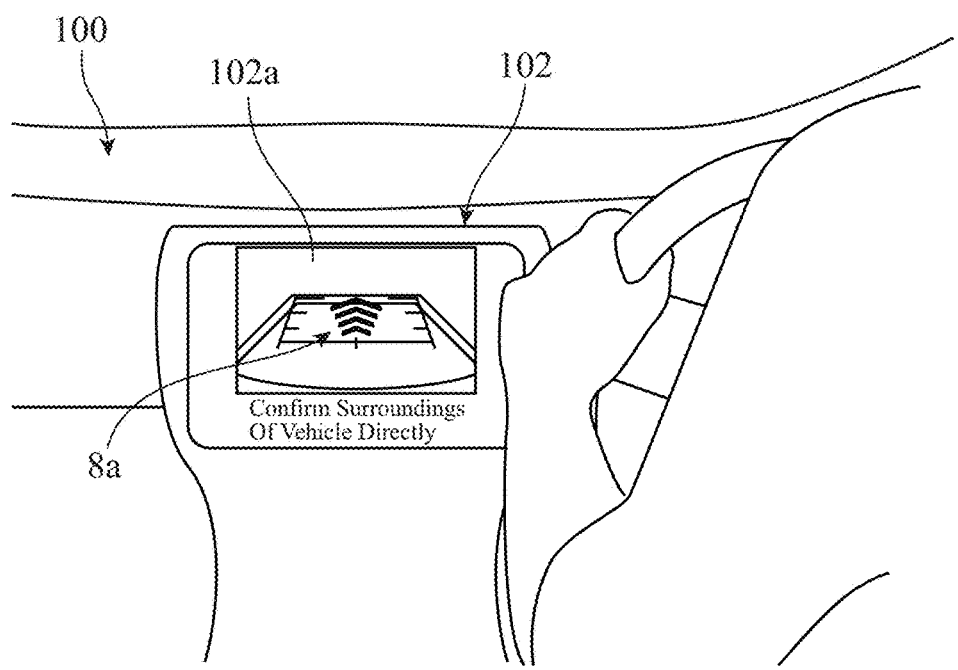
FIG. 18 is a diagram illustrating a state where display information for notifying a person outside a vehicle of a vehicle state where the vehicle is about to move backward is displayed on an in-vehicle monitor.

FIG. 18 is a diagram illustrating a state where display information 8a for notifying a person outside the vehicle 100 of a vehicle state where the vehicle 100 is about to move backward is displayed on an in-vehicle monitor 102, and illustrates the interior of the vehicle 100. The in-vehicle monitor 102 illustrated in FIG. 18 is a monitor that allows an occupant to visually recognize the information displayed on the screen 102a, and is achieved, for example, by the in-vehicle monitor 2i of the navigation system 1p disposed in the vehicle. Display on the in-vehicle monitor 102 is controlled by the overall control ECU 2.

In response to display of the display information 8a corresponding to a vehicle state where the vehicle 100 is about to move backward outside the vehicle, the irradiation apparatus 3 according to the second embodiment instructs the overall control ECU 2 to display the display information 8a on the in-vehicle monitor 102.

For example, when the determination unit 31 determines that the situation inside and outside the vehicle meets a display start condition of the display information 8a, the control unit 32 instructs the overall control ECU 2 to display the display information 8a on the in-vehicle monitor 102. As a result, the overall control ECU 2 displays the display information 8a on the in-vehicle monitor 102 in accordance with the instruction from the control unit 32.

An occupant of the vehicle can confirm that the display information regarding the backward movement of the vehicle 100 is displayed outside the vehicle by visually recognizing the display on the in-vehicle monitor 102.

That is, the occupant can determine an action to be performed next after confirming the situation where the display information attracts attention of a person outside the vehicle to the backward movement of the vehicle 100.

Note that FIG. 18 illustrates the case where the display information 8a is displayed while being superimposed on the situation behind the vehicle 100 displayed on the in-vehicle monitor 102, but limitation thereto is not intended.

For example, an in-vehicle lamp disposed in the interior of a hatch back door of the vehicle 100, a lamp attached to an in-vehicle monitor, or a lamp attached to a side mirror may be lit according to display of the display information 8a.

Figure 19:
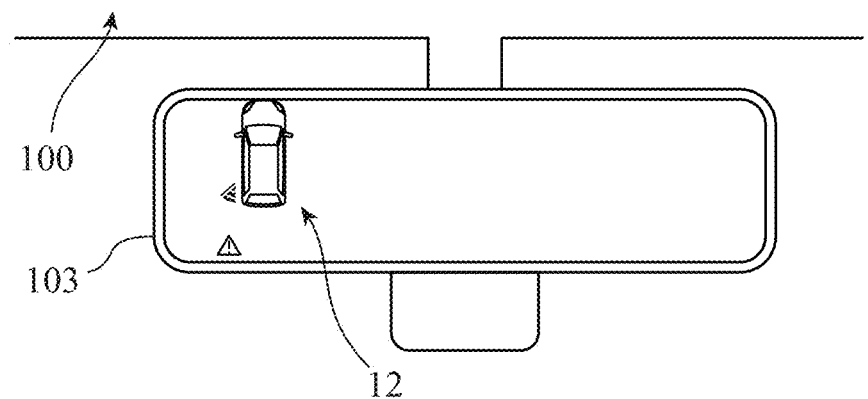
FIG. 19 is a diagram illustrating a state where image information corresponding to a vehicle state where a door of a vehicle is about to be opened is displayed on a rearview mirror monitor.

FIG. 19 is a diagram illustrating a state where image information 12 corresponding to a vehicle state where a door of the vehicle is about to be opened is displayed on a rearview mirror monitor 103, and illustrates the interior of the vehicle 100. The rearview mirror monitor 103 is a monitor attached to the rearview mirror of the vehicle 100. Display on the rearview mirror monitor 103 is controlled by the overall control ECU 2.

The irradiation apparatus 3 according to the second embodiment instructs the overall control ECU 2 to display the image information 12 on the rearview mirror monitor 103 in response to display of display information corresponding to a vehicle state where a door of the vehicle is about to be opened.

For example, when the determination unit 31 determines that the situation inside and outside the vehicle meets a display start condition of the above display information, the control unit 32 instructs the overall control ECU 2 to display the image information 12 on the rearview mirror monitor 103. As a result, the overall control ECU 2 displays the image information 12 on the rearview mirror monitor 103 in accordance with the instruction from the control unit 32.

The image information 12 is an image (around view or bird eye view) overlooking the vehicle 100 displaying the above display information outside the vehicle.

An occupant of the vehicle can confirm that the display information regarding opening the vehicle door is displayed outside the vehicle by visually recognizing the display on the rearview mirror monitor 103. That is, the occupant can determine an action to be performed next after confirming the situation where the image information 12 attracts attention of a person outside the vehicle to opening the door.

Figure 20:
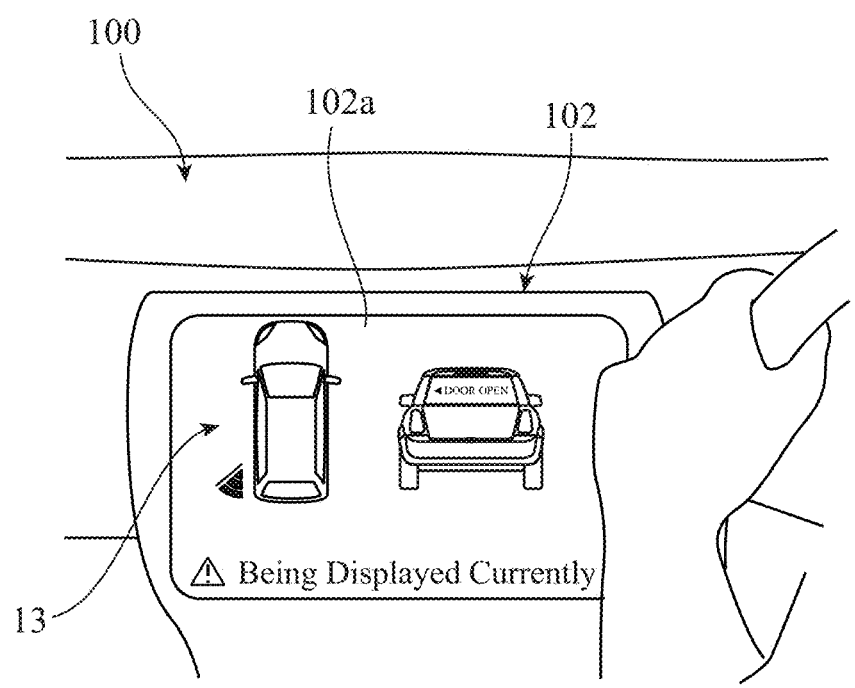
FIG. 20 is a diagram illustrating a state where image information corresponding to a vehicle state where a door of a vehicle is about to be opened is displayed on an in-vehicle monitor.

FIG. 20 is a diagram illustrating a state where image information 13 corresponding to a vehicle state where a door of the vehicle is about to be opened is displayed on the in-vehicle monitor 102.

As illustrated in FIG. 20, the image information 13 is an image obtained by combining an image overlooking the vehicle 100 displaying display information outside the vehicle (animation is displayed on a road surface) with an image of the vehicle 100 displaying the display information outside the vehicle (display on the rear window) viewed from the rear side.

An occupant of the vehicle can confirm that the display information regarding opening a door of the vehicle is displayed outside the vehicle by visually recognizing the image information 13.

Now, return to the description of FIG. 16.

The control unit 32 confirms whether or not display of information outside the vehicle has been ended (step ST3a). If the determination unit 31 determines that the situation inside and outside the vehicle does not meet a display end condition, the control unit 32 continues to display information outside the vehicle (step ST3a; NO). In this case, the control unit 32 repeats the process of step ST3a. While this process is being performed, display of information outside the vehicle and notification in the vehicle are continued.

Meanwhile, when the determination unit 31 determines that the situation inside and outside the vehicle meets the display end condition, the control unit 32 ends the display of the information outside the vehicle by controlling the light device 4a or the light device 4b.

Figure 21A:
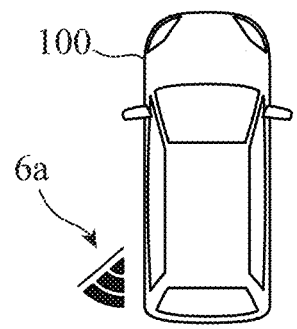
FIG. 21A is a diagram illustrating an example of display information for notifying a person outside a vehicle of a vehicle state where the left rear door is about to be opened.
Figure 21B:
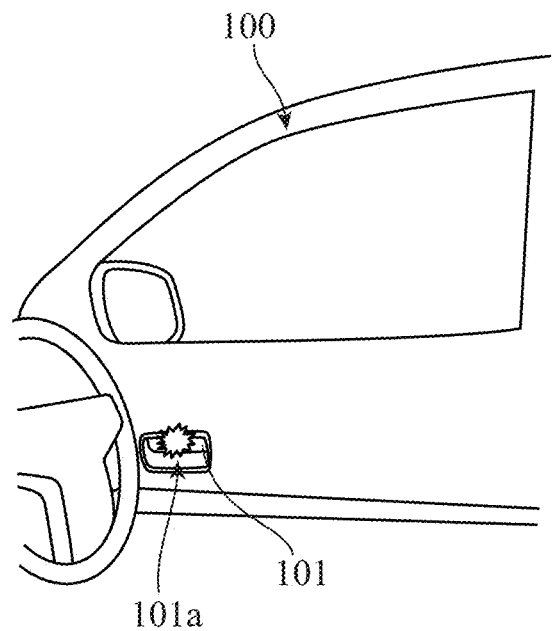
FIG. 21B is a diagram illustrating a lighting state of a door knob lamp interlocked with display of the display information in FIG. 21A.

FIG. 21A is a diagram illustrating display information 6a for notifying a person outside the vehicle 100 of a vehicle state where the left rear door is about to be opened, and illustrates the vehicle 100 viewed from above. FIG. 21B is a diagram illustrating a lighting state of the door knob lamp 101a interlocked with display of the display information 6a of FIG. 21A, and illustrates the interior of the vehicle 100. When the situation inside and outside the vehicle meets a display start condition of the display information 6a, the control unit 32 displays the display information 6a by controlling the light device 4a as illustrated in FIG. 20A. As illustrated in FIG. 21B, the door knob lamp 101a starts lighting at the timing when the display of the display information 6a is started.

Subsequently, the control unit 32 determines whether or not a certain time has elapsed after the end of the display of the information outside the vehicle (step ST4a).

If a certain time has not elapsed after the end of the display of the information outside the vehicle (step ST4a; NO), the control unit 32 repeats the process of step ST4a. While this process is being performed, the notification in the vehicle is continued.

Figure 22A:
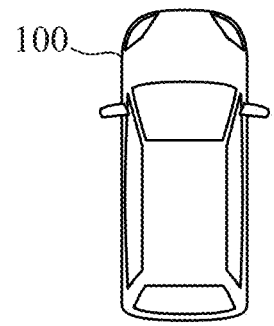
FIG. 22A is a diagram illustrating a state immediately after the end of display of display information for notifying a person outside a vehicle of a vehicle state where the left rear door is about to be opened.
Figure 22B:
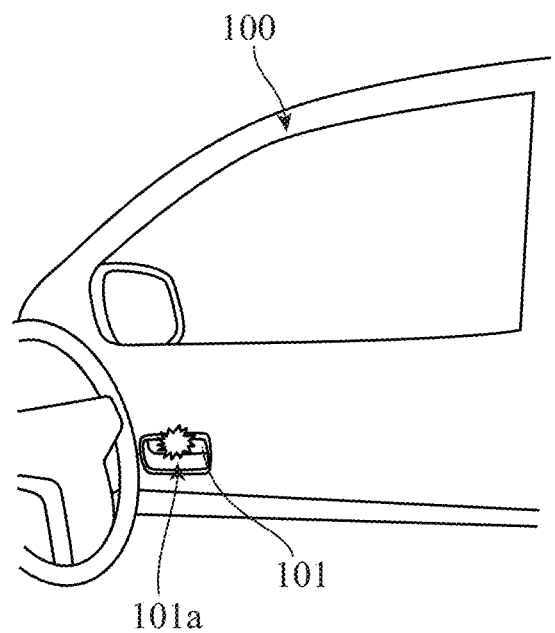
FIG. 22B is a diagram illustrating a lighting state of a door knob lamp in the state of FIG. 22A.

FIG. 22A is a diagram illustrating a state immediately after the end of display of the display information 6a for notifying a person outside the vehicle of a vehicle state where the left rear door is about to be opened, and illustrates the vehicle 100 viewed from above. FIG. 22B is a diagram illustrating a lighting state of the door knob lamp 101a in the state of FIG. 22A, and illustrates the interior of the vehicle 100. When the situation inside and outside the vehicle meets a display end condition of the display information 6a, the control unit 32 ends the display of the display information 6a by controlling the light device 4a as illustrated in FIG. 22A. When a certain time has not elapsed after the end of the display of the display information 6a, the door knob lamp 101a continues to be lit as illustrated in FIG. 22B.

If a certain period of time has elapsed after the end of the display of the information outside the vehicle (step ST4a; YES), the control unit 32 ends the notification in the vehicle by extinguishing the door knob lamp 101a (step ST5a).

Figures 23A, 23B:
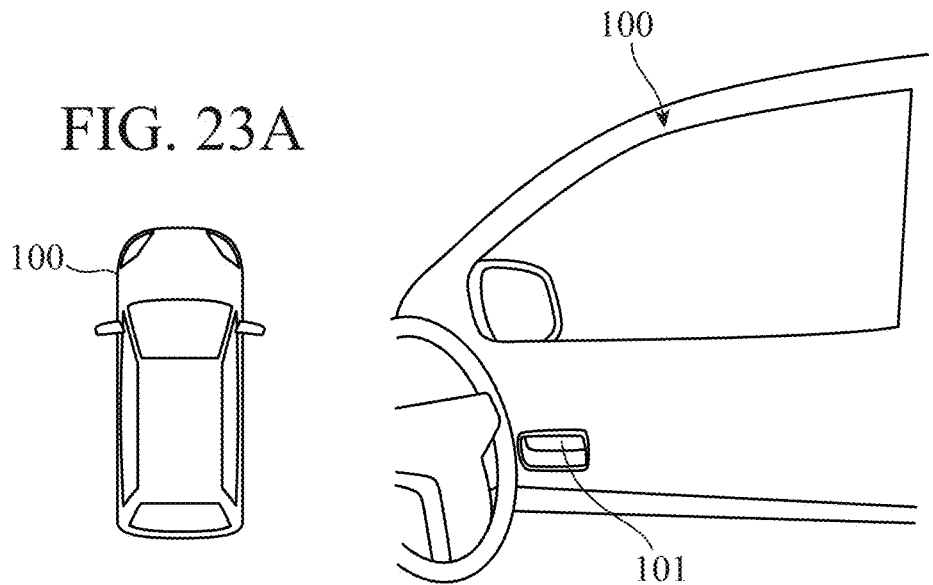
FIG. 23A is a diagram illustrating a state where a certain time has elapsed after the end of display of display information for notifying a person outside a vehicle of a vehicle state where the left rear door is about to be opened.
FIG. 23B is a diagram illustrating a lighting state of a door knob lamp in the state of FIG. 23A.

FIG. 23A is a diagram illustrating a state where a certain time has elapsed after the end of the display of the display information 6a for notifying a person outside the vehicle of a vehicle state where the left rear door is about to be opened, and illustrates the vehicle 100 viewed from above. FIG. 23B is a diagram illustrating a lighting state of the door knob lamp 101a in the state of FIG. 23A, and illustrates the interior of the vehicle 100.

When a certain time (about three seconds) has elapsed after the end of the display of the display information 6a, the door knob lamp 101a is extinguished as illustrated in FIG. 23B.

For example, when a certain time has elapsed after the end of the display of the display information 6a, the control unit 32 instructs the light driver 4c1 to extinguish the door knob lamp 101a. The light driver 4c1 extinguishes the door knob lamp 101a in accordance with the instruction from the control unit 32.

An occupant of the vehicle can confirm that the display information 6a regarding opening the door is displayed outside the vehicle by visually recognizing a lighting state of the door knob lamp 101a.

However, when the door knob lamp 101a is extinguished immediately after the end of the display of the display information 6a, the occupant may feel uneasy about whether the vehicle is in an out-of-vehicle situation that does not require attraction of attention with the display information 6a.

Therefore, the inventor of the present application made intensive studies and experiments on a relationship between display outside a vehicle and notification in the vehicle, and as a result, has found that the occupant's uneasiness described above can be reduced by continuing the notification in the vehicle for a certain time (about three seconds) after the end of display of information outside the vehicle.

That is, the operation illustrated in FIG. 16 is obtained by incorporating new finding found by the inventor into the operation of the irradiation apparatus 3.

Note that it has been described that lighting of the door knob lamp 101a is continued until a certain time has elapsed, but the occupant's uneasiness can be reduced similarly by continuing display also in the display on the in-vehicle monitor 102 and the display on the rearview mirror monitor 103.

As described above, in the irradiation apparatus 3 according to the second embodiment, the control unit 32 causes the door knob lamp 101a, the in-vehicle monitor 102, and the rearview mirror monitor 103 to notify a person in the vehicle that the display information is being displayed outside the vehicle. As a result, an occupant of the vehicle can confirm that the display information is being displayed outside the vehicle by visually recognizing these.

In the irradiation apparatus 3 according to the second embodiment, the control unit 32 causes the door knob lamp 101a, the in-vehicle monitor 102, and the rearview mirror monitor 103 to continue notification in the vehicle until a certain time has elapsed after the end of the display of the display information outside the vehicle.

As a result, the occupant's uneasiness about whether the vehicle is in an out-of-vehicle situation that does not require attraction of attention with the display information can be reduced.

Third Embodiment

In a third embodiment, a configuration in which blinking of a light pattern of an animation to be displayed outside a vehicle is controlled according to an out-of-vehicle lamp will be described.

The configuration of an irradiation apparatus according to the third embodiment is basically the same as the configuration illustrated in FIGS. 1 and 2 of the first embodiment. Therefore, also in the third embodiment, FIG. 1 is referred to for a hardware configuration, and FIG. 2 is referred to for a functional configuration.

Next, the operation will be described.

Figure 24:
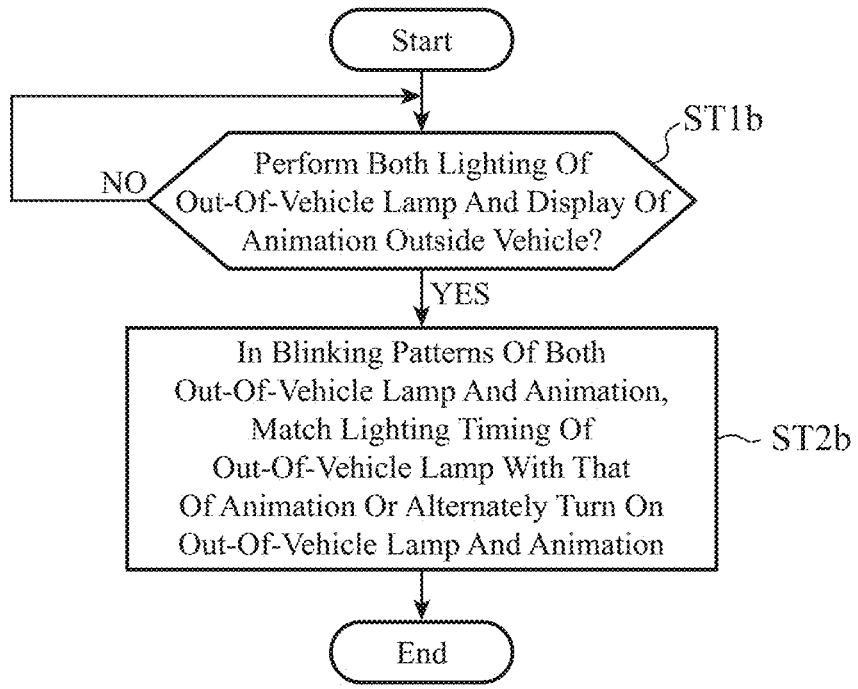
FIG. 24 is a flowchart illustrating operation of an irradiation apparatus according to a third embodiment of the present invention.

FIG. 24 is a flowchart illustrating operation of an irradiation apparatus 3 according to the third embodiment of the present invention. First, similar to the first embodiment, a control unit 32 displays an animation outside a vehicle by controlling a light device 4a. At this time, the control unit 32 confirms whether or not both lighting of an out-of-vehicle lamp and display of an animation outside the vehicle are performed (step ST1b).

If lighting of an out-of-vehicle lamp is not performed only by performing display of an animation outside the vehicle (step ST1b; NO), the control unit 32 repeats the process of step ST1b.

Figure 25:
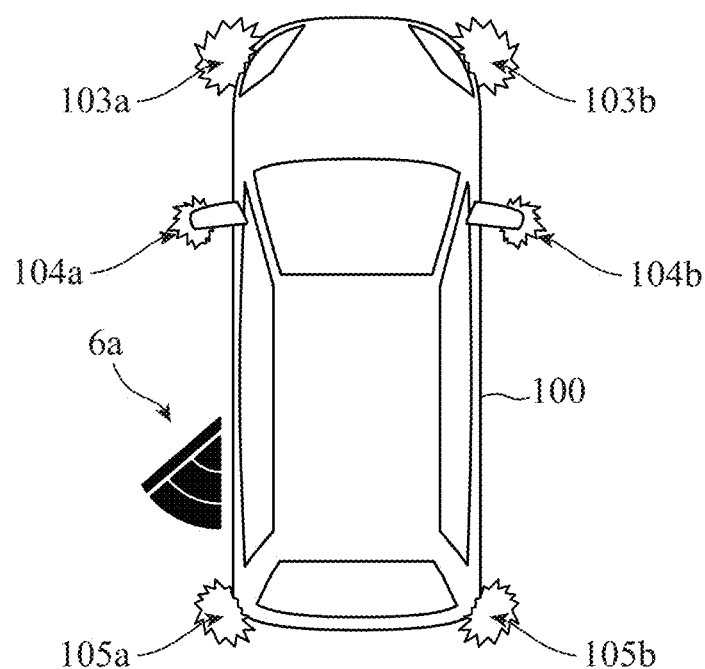
FIG. 25 is a diagram illustrating an out-of-vehicle lamp and display information in the third embodiment.

FIG. 25 is a diagram illustrating out-of-vehicle lamps 103a, 103b, 104a, 104b, 105a, and 105b and display information 6a in the third embodiment.

In FIG. 25, the out-of-vehicle lamps 103a, 103b, 104a, 104b, 105a, and 105b are the lights 4d2 included in the light device 4d illustrated in FIG. 1, and lighting thereof is controlled by a light driver 4d1. The out-of-vehicle lamps 103a and 103b are blinker lamps of a vehicle 100, the out-of-vehicle lamps 104a and 104b are side mirror lamps of the vehicle 100, and the out-of-vehicle lamps 105a and 105b are hazard lamps or brake lamps of the vehicle 100. The display information 6a is an animation in which a plurality of light patterns blinks as illustrated in FIG. 4A.

When the display information 6a is displayed while light emitted from an out-of-vehicle lamp is blinking, irregularly blinking light is generated in some blinking patterns of the display information 6a.

In this case, a person around the vehicle may be dazzled, visibility of the display information 6a may be lowered, and it may be impossible to attract sufficient attention.

Therefore, if both lighting of an out-of-vehicle lamp and display of an animation outside the vehicle are performed (step ST1b; YES), when a light pattern of the animation is blinked while the out-of-vehicle lamp is blinking, the control unit 32 matches the lighting timing of a light pattern of the animation with the lighting timing of the out-of-vehicle lamp, or alternately lights the out-of-vehicle lamp and the light pattern of the animation by controlling the light device 4a (step ST2b).

As a result, dazzling resulting from irregularly blinking light is prevented, and visibility of the animation is also improved.

Figure 26:
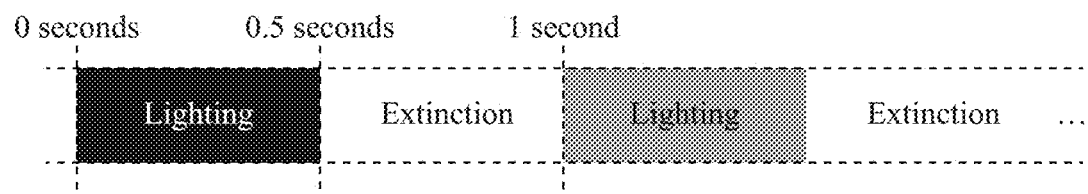
FIG. 26 is a diagram illustrating a blinking pattern of an out-of-vehicle lamp.
Figure 27A:
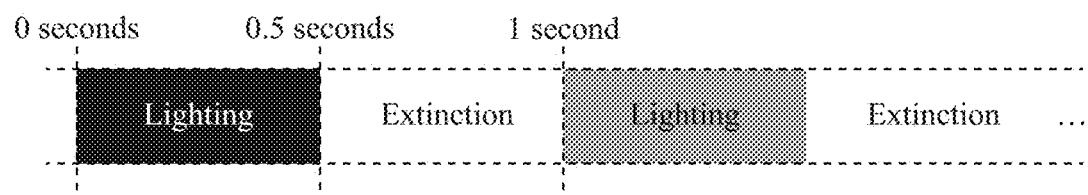
FIG. 27A is a diagram illustrating a blinking pattern (pattern A) of display information in the third embodiment.
Figure 27B:
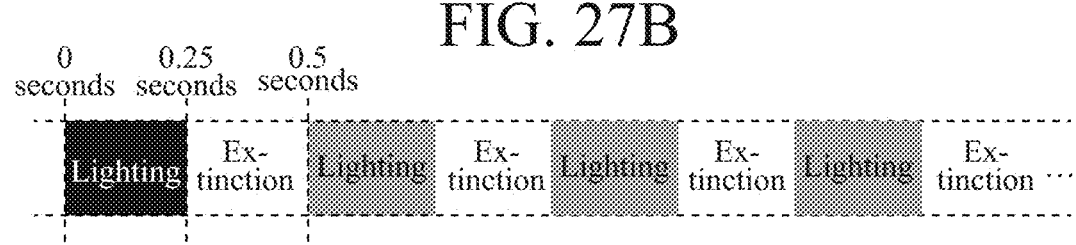
FIG. 27B is a diagram illustrating a blinking pattern (pattern B) of display information in the third embodiment.

FIG. 26 is a diagram illustrating a blinking pattern of an out-of-vehicle lamp. FIG. 27A is a diagram illustrating a blinking pattern (pattern A) of the display information 6a in the third embodiment. FIG. 27B is a diagram illustrating a blinking pattern (pattern B) of the display information 6a in the third embodiment.

As illustrated in FIG. 26, for example, the out-of-vehicle lamp has a blinking pattern in which lighting and extinction are repeated at intervals of 0.5 seconds. As illustrated in FIG. 27A, the display information 6a has a blinking pattern (pattern A) in which lighting and extinction are repeated at intervals of 0.5 seconds as a light pattern. Note that, as illustrated in FIG. 27B, the display information 6a may have a blinking pattern (pattern B) in which lighting and extinction are repeated at intervals of 0.25 seconds as a light pattern.

Note that these are only examples, and the blinking pattern of the display information can be set freely.

Figure 28A:
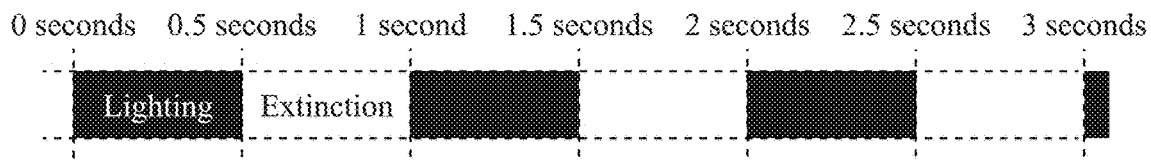
FIG. 28A is a diagram illustrating a blinking pattern of an out-of-vehicle lamp.
Figure 28B:
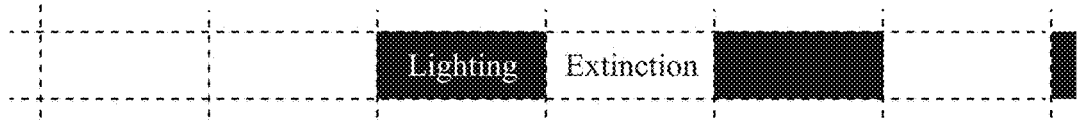
FIG. 28B is a diagram illustrating a blinking pattern (pattern A) of display information in which lighting is repeated simultaneously with the out-of-vehicle lamp in FIG. 28A.
Figure 29A:
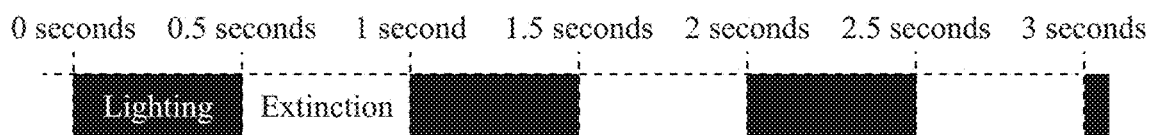
FIG. 29A is a diagram illustrating a blinking pattern of an out-of-vehicle lamp.
Figure 29B:
FIG. 29B is a diagram illustrating a blinking pattern (pattern B) of display information in which lighting is repeated simultaneously with the out-of-vehicle lamp in FIG. 29A.

FIG. 28A is a diagram illustrating a blinking pattern of an out-of-vehicle lamp. FIG. 28B is a diagram illustrating a blinking pattern (pattern A) of the display information 6a in which lighting is repeated simultaneously with the out-of-vehicle lamp in FIG. 28A. FIG. 29A is a diagram illustrating a blinking pattern of an out-of-vehicle lamp. FIG. 29B is a diagram illustrating a blinking pattern (pattern B) of the display information 6a in which lighting is repeated simultaneously with the out-of-vehicle lamp in FIG. 29A. As illustrated in FIGS. 28A, 28B, 29A, and 29B, when the blinking pattern of the display information 6a is a pattern in which lighting is repeated simultaneously with the out-of-vehicle lamp, irregular blinking light is not generated, and a person around the vehicle is not dazzled.

However, when the blinking pattern of the display information 6a causes lighting earlier than the lighting timing of the out-of-vehicle lamp, irregular blinking light is generated, causing dazzling.

Therefore, when the lighting timing of the display information 6a is earlier than that of the out-of-vehicle lamp, the control unit 32 performs correction to match the lighting timing of the display information 6a with that of the out-of-vehicle lamp by extending the lighting time of the light pattern of the display information 6a.

Figure 30A:
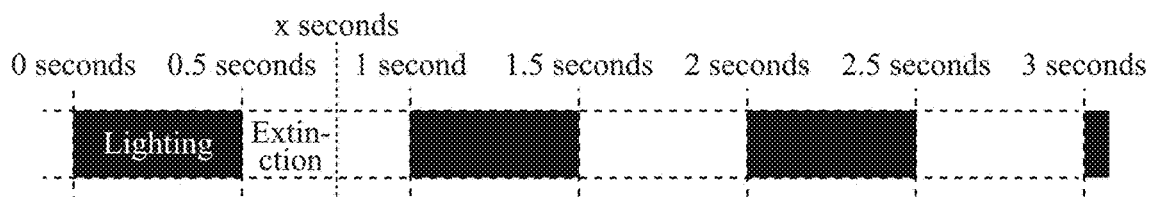
FIG. 30A is a diagram illustrating a blinking pattern of an out-of-vehicle lamp.
Figure 30B:
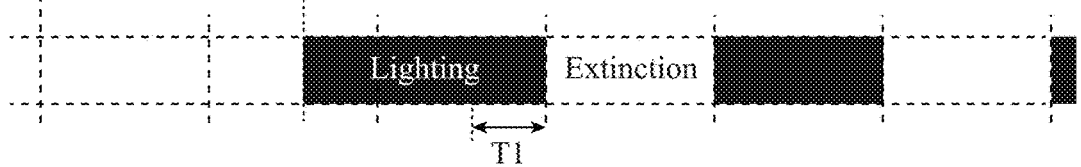
FIG. 30B is a diagram illustrating a corrected blinking pattern (pattern A) of display information that was lit earlier than the lighting timing of the out-of-vehicle lamp in FIG. 30A.

FIG. 30A is a diagram illustrating a blinking pattern of an out-of-vehicle lamp. FIG. 30B is a diagram illustrating a corrected blinking pattern (pattern A) of the display information 6a that was lit earlier than the lighting timing of the out-of-vehicle lamp in FIG. 30A. When the lighting timing of the display information 6a is earlier than that of the out-of-vehicle lamp, the control unit 32 extends the lighting time of the pattern A by time T1 by controlling the light device 4a. As a result, the lighting timing of the display information 6a can be matched with the lighting timing of the out-of-vehicle lamp. Note that the time T1 is about (1−x) seconds.

Figure 31A:
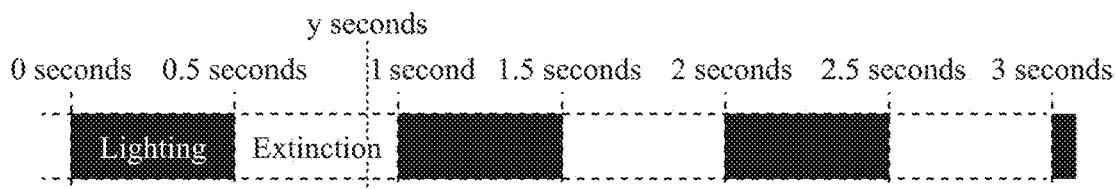
FIG. 31A is a diagram illustrating a blinking pattern of an out-of-vehicle lamp.
Figure 31B:
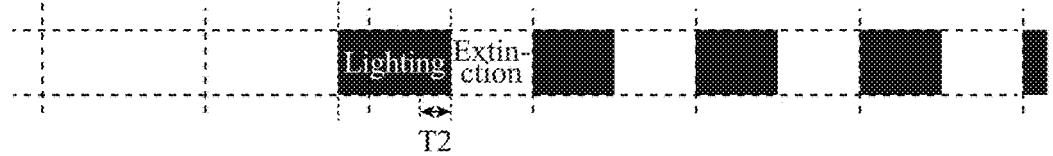
FIG. 31B is a diagram illustrating a corrected blinking pattern (pattern B) of display information that was lit earlier than the lighting timing of the out-of-vehicle lamp in FIG. 31A.

FIG. 31A is a diagram illustrating a blinking pattern of an out-of-vehicle lamp. FIG. 31B is a diagram illustrating a corrected blinking pattern (pattern B) of the display information 6a that was lit earlier than the lighting timing of the out-of-vehicle lamp in FIG. 31A. When the lighting timing of the display information 6a is earlier than that of the out-of-vehicle lamp, the control unit 32 extends the lighting time of the light pattern B by time T2 by controlling the light device 4a. As a result, the lighting timing of the display information 6a can be matched with the lighting timing of the out-of-vehicle lamp. Note that the time T2 is about (1−y) seconds.

Also when the blinking pattern of the display information 6a causes lighting later than the lighting timing of the out-of-vehicle lamp, irregular blinking light is generated, causing dazzling.

Therefore, when the lighting timing of the display information 6a is later than that of the out-of-vehicle lamp, the control unit 32 performs correction to match the lighting timing of the display information 6a with that of the out-of-vehicle lamp by shortening the extinction time of the light pattern of the display information 6a.

Figure 32A:
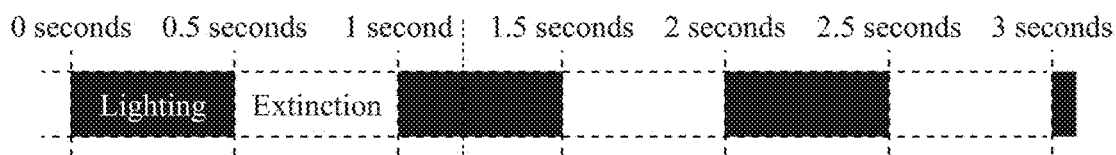
FIG. 32A is a diagram illustrating a blinking pattern of an out-of-vehicle lamp.
Figure 32B:
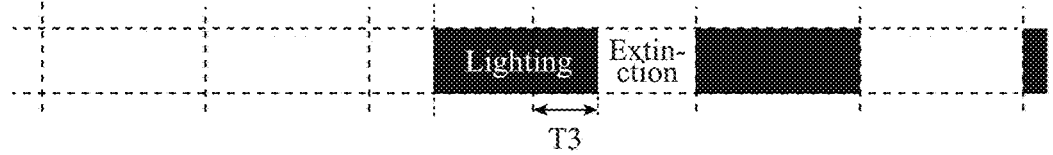
FIG. 32B is a diagram illustrating a corrected blinking pattern (pattern A) of display information that was lit later than the lighting timing of the out-of-vehicle lamp in FIG. 32A.

FIG. 32A is a diagram illustrating a blinking pattern of an out-of-vehicle lamp. FIG. 32B is a diagram illustrating a corrected blinking pattern (pattern A) of the display information 6a that was lit later than the lighting timing of the out-of-vehicle lamp in FIG. 32A. When the lighting timing of the display information 6a is later than that of the out-of-vehicle lamp, the control unit 32 shortens the extinction time of the pattern A by time T3 by controlling the light device 4a. As a result, the lighting timing of the display information 6a can be matched with the lighting timing of the out-of-vehicle lamp.

Figure 33A:
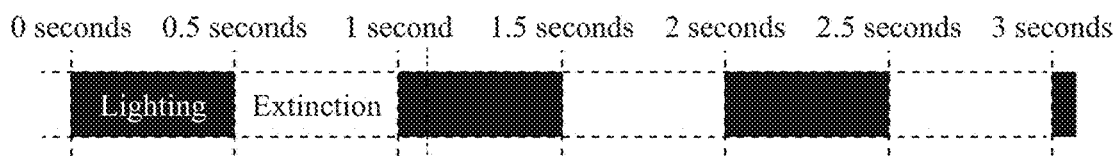
FIG. 33A is a diagram illustrating a blinking pattern of an out-of-vehicle lamp.
Figure 33B:
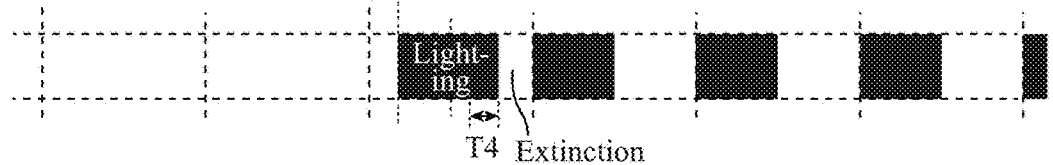
FIG. 33B is a diagram illustrating a corrected blinking pattern (pattern B) of display information that was lit later than the lighting timing of the out-of-vehicle lamp in FIG. 33A.

FIG. 33A is a diagram illustrating a blinking pattern of an out-of-vehicle lamp. FIG. 33B is a diagram illustrating a corrected blinking pattern (pattern B) of the display information 6a that was lit later than the lighting timing of the out-of-vehicle lamp in FIG. 33A. When the lighting timing of the display information 6a is later than that of the out-of-vehicle lamp, the control unit 32 shortens the extinction time of the pattern B by time T4 by controlling the light device 4a. As a result, the lighting timing of the display information 6a can be matched with the lighting timing of the out-of-vehicle lamp.

The control unit 32 may alternately light the out-of-vehicle lamp and the light pattern of the display information 6a by extending the lighting time of the light pattern of the display information 6a. Also, this can prevent dazzling of a person around the vehicle without generation of irregular blinking light.

Figure 34A:
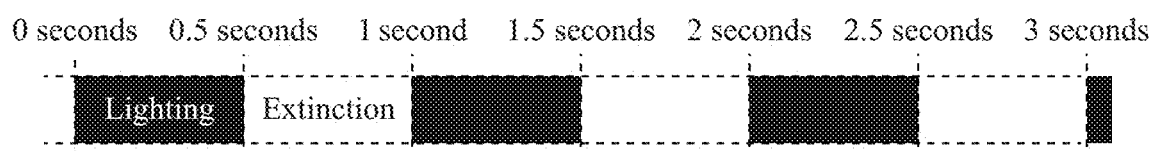
FIG. 34A is a diagram illustrating a blinking pattern of an out-of-vehicle lamp.
Figure 34B:
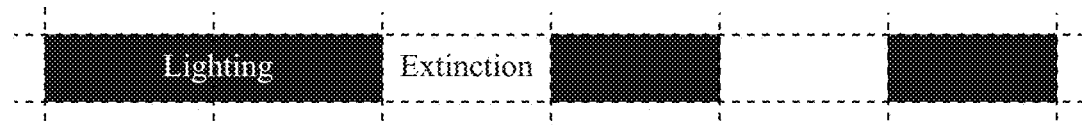
FIG. 34B is a diagram illustrating a blinking pattern (pattern A) of display information in which the lighting timing is corrected so as to be lit alternately with the out-of-vehicle lamp in FIG. 34A.

FIG. 34A is a diagram illustrating a blinking pattern of an out-of-vehicle lamp. FIG. 34B is a diagram illustrating a blinking pattern (pattern A) of the display information 6a in which the lighting timing has been corrected in such a manner that the display information 6a is lit alternately with the out-of-vehicle lamp in FIG. 34A. When the lighting timing of the display information 6a is earlier than that of the out-of-vehicle lamp, the control unit 32 extends the lighting time of the pattern A by controlling the light device 4a. As a result, the out-of-vehicle lamp and the light pattern of the display information 6a can be lit alternately.

Figure 35A:
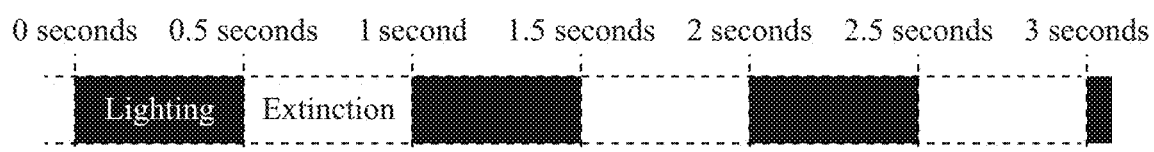
FIG. 35A is a diagram illustrating a blinking pattern of an out-of-vehicle lamp.
Figure 35B:
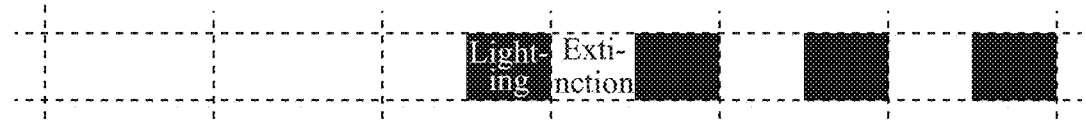
FIG. 35B is a diagram illustrating a blinking pattern (pattern B) of display information in which the lighting timing is corrected so as to be lit alternately with the out-of-vehicle lamp in FIG. 35A.

FIG. 35A is a diagram illustrating a blinking pattern of an out-of-vehicle lamp. FIG. 35B is a diagram illustrating a blinking pattern (pattern B) of the display information 6a in which the lighting timing has been corrected in such a manner that the display information 6a is lit alternately with the out-of-vehicle lamp in FIG. 35A. When the lighting timing of the display information 6a is earlier than that of the out-of-vehicle lamp, the control unit 32 shortens the extinction time of the pattern B by controlling the light device 4a. As a result, the out-of-vehicle lamp and the light pattern of the display information 6a can be lit alternately.

As described above, in the irradiation apparatus 3 according to the third embodiment, when both the out-of-vehicle lamp and the light pattern of the animation are blinked, the lighting timing of the light pattern of the animation matches the lighting timing of the out-of-vehicle lamp. As a result, irregular blinking light is not generated, and dazzling of a person around the vehicle can be prevented. Visibility of an animation is also improved.

In the irradiation apparatus 3 according to the third embodiment, when both the out-of-vehicle lamp and the light pattern of the animation are blinked, the out-of-vehicle lamp and the light pattern of the animation are lit alternately. Also, such a configuration can prevent dazzling of a person around the vehicle without generation of irregular blinking light. Visibility of an animation is also improved.

The case where the control unit 32 matches the lighting timing of the light pattern of the animation with the lighting timing of the out-of-vehicle lamp, or alternately lights the out-of-vehicle lamp and the light pattern of the animation by dynamically controlling the light device 4a has been described. However, limitation thereto is not intended. For example, the control unit 32 may display an animation in which the lighting timing of the light pattern matches the lighting timing of the out-of-vehicle lamp in advance in the light device 4a, or may display an animation of a blinking pattern that is lit alternately with the out-of-vehicle lamp in the light device 4a.

Note that in the third embodiment, the blinking control of display information immediately after "start of display of display information" illustrated in the first embodiment has been described as an example, but also "when the display mode of display information is changed" and "when the display mode is changed and then returned to the original display mode again", the blinking control of the display information may be similarly performed according to lighting of the out-of-vehicle lamp.

Note that the present invention is not limited to the above embodiments, and the embodiments can be freely combined with one another, any component in the embodiments can be modified, or any component in the embodiments can be omitted within the scope of the present invention.

INDUSTRIAL APPLICABILITY

The irradiation apparatus according to the present invention can accurately inform a target person outside a vehicle of information displayed outside the vehicle, and therefore can be used for various driving support devices, for example.

REFERENCE SIGNS LIST

1: vehicle device, 1a: vehicle speed sensor, 1b: steering angle sensor, 1c: accelerator sensor, 1d: brake sensor, 1e: shift sensor, 1f: blinker sensor, 1g: hazard sensor, 1h: wiper sensor, 1i: light sensor, 1j: door open/close sensor, 1k: driver camera, 1l: seating sensor, 1m: acceleration sensor, 1n: angular velocity sensor, 1o: GPS device, 1p: navigation system, 1q: out-of-vehicle camera, 1r: out-of-vehicle sensor, 1s: illuminance sensor, 1t: door knob sensor, 1u: seat belt sensor, 2: overall control ECU, 2a, 3a-1, 3b-1: processor, 2b, 3a-2, 3b-2: ROM, 2c, 3a-3, 3b-3: RAM, 2d: engine, 2e: transmission, 2f: brake actuator, 2g: steering actuator, 2h: HUD, 2i, 102: in-vehicle monitor, 3: irradiation apparatus, 3A: lighting control device, 3a: integration determination ECU, 3b: light control ECU, 4a to 4d: light device, 4a1 to 4d1: light driver, 4a2 to 4d2: light, 5: wireless communication device, 5a: antenna, 5b: transmitting unit, 5c: receiving unit, 6a, 6b, 7a-1, 7a-2, 7b, 8a, 8b, 9, 9a to 9d, 10a, 10b, 11a, 11b: display information, 12, 13: image information, 30: information acquisition unit, 31: determination unit, 32: control unit, 100, 300: vehicle, 101: door knob, 101a: door knob lamp, 102a: screen, 103: rearview mirror monitor, 103a, 103b, 104a, 104b, 105a, 105b: out-of-vehicle lamp, 200a to 200e: pedestrian, 200f: bicycle.

The invention claimed is:

1. An irradiation apparatus comprising: one or more irradiators to display information outside a vehicle by emitting light: an information acquirer to acquire information regarding a situation inside and outside the vehicle; a determiner to determine whether the information regarding the situation inside and outside the vehicle acquired by the information acquirer meets a display start condition; and a controller to display, outside the vehicle, the information corresponding to the display start condition determined by the determiner to meet the information regarding the situation inside and outside the vehicle by controlling the one or more irradiators, wherein the determiner determines whether the information regarding the situation outside the vehicle acquired by the information acquirer meets a display change condition after display of the information outside the vehicle, and the controller changes a display mode of each of pieces of the information displayed outside the vehicle by controlling the one or more irradiators when the determiner determines that the information regarding the situation outside the vehicle meets the display change condition, comprising a first out-of-vehicle sensor that is a sensor detecting an object around the vehicle; and a second out-of-vehicle sensor that is a sensor detecting an object around the vehicle and is disposed at a position different from the first out-of-vehicle sensor, wherein the information acquirer obtains detection information of the first out-of-vehicle sensor and the second out-of-vehicle sensor, and the determiner determines at least one of matching between the detection information and the display start condition, and matching between the detection information and the display change condition on a basis of detection information of the first out-of-vehicle sensor and detection information of the second out-of-vehicle sensor.

2. The irradiation apparatus according to claim 1, wherein the determiner performs at least one of a first determination to determine matching with the display start condition on a basis of detection information of the first out-of-vehicle sensor and detection information of the second out-of-vehicle sensor, and a second determination to determine matching with the display start condition on a basis of detection information of the first out-of-vehicle sensor and to determine matching with the display change condition on a basis of detection information of the second out-of-vehicle sensor.

3. The irradiation apparatus according to claim 1, wherein the controller displays an animation in which an irradiation state of a light pattern including a single or a plurality of light elements continuously changes outside the vehicle by controlling the one or more irradiators.

4. The irradiation apparatus according to claim 1, wherein the controller displays an image outside the vehicle by controlling the one or more irradiators.

5. The irradiation apparatus according to claim 3, wherein the controller changes at least one of a color, brightness, an irradiation position, and an irradiation state change speed of the light pattern in the animation by controlling the one or more irradiators.

6. The irradiation apparatus according to claim 4, wherein the controller changes at least one of a shape, a color, brightness, a size, a display position, display timing, and display time of the image displayed outside the vehicle by controlling the one or more irradiators.

7. The irradiation apparatus according to claim 1, wherein the determiner determines whether at least one of a position of a moving object around the vehicle, a moving direction thereof, a distance between the vehicle and the moving object, and a moving speed meets a display change condition, and when it is determined that at least one of the positions of the moving object, the moving direction thereof, the distance between the vehicle and the moving object, and the moving speed meets the display change condition, the controller changes a display mode of one or more pieces of information by controlling the one or more irradiators.

8. The irradiation apparatus according to claim 1, wherein the determiner determines whether the information regarding the situation inside and outside the vehicle acquired by the information acquirer meets a display return condition after change of the display mode of the information displayed outside the vehicle, and when the determiner determines that the information regarding the situation inside and outside the vehicle meets the display return condition, the controller returns the information displayed outside the vehicle to the display mode before the change by controlling the one or more irradiators.

9. The irradiation apparatus according to claim 1, wherein the controller causes an in-vehicle notificater to notify a person in the vehicle that information is being displayed outside the vehicle.

10. The irradiation apparatus according to claim 9, wherein the in-vehicle notificater is an in-vehicle lamp or an in-vehicle monitor for emitting light in the vehicle.

11. The irradiation apparatus according to claim 9, wherein the controller causes the in-vehicle notificater to continue the notification to a person in the vehicle until a certain time has elapsed after end of display of information outside the vehicle.

12. The irradiation apparatus according to claim 3, wherein when both an out-of-vehicle lamp for emitting light outside the vehicle and a light pattern of the animation are blinked, a lighting timing of the light pattern of the animation matches a lighting timing of the out-of-vehicle lamp.

13. The irradiation apparatus according to claim 12, wherein when the lighting timing of the animation is earlier than the lighting timing of the out-of-vehicle lamp, the controller matches the lighting timing of the light pattern of the animation with the lighting timing of the out-of-vehicle lamp by extending lighting time of the light pattern of the animation.

14. The irradiation apparatus according to claim 12, wherein when the lighting timing of the animation is later than the lighting timing of the out-of-vehicle lamp, the controller matches the lighting timing of the light pattern of the animation with the lighting timing of the out-of-vehicle lamp by shortening extinction time of the light pattern of the animation.

15. The irradiation apparatus according to claim 3, wherein when both an out-of-vehicle lamp for emitting light outside the vehicle and a light pattern of the animation are blinked, the light pattern of the animation and the out-of-vehicle lamp are alternately lit.

16. The irradiation apparatus according to claim 1, wherein the determiner determines whether matching with a display end condition on a basis of detection information of the first out-of-vehicle sensor and detection information of the second out-of-vehicle sensor, acquired by the information acquirer after information is displayed outside the vehicle.

17. An irradiation apparatus, comprising:
one or more irradiators to display information outside a vehicle by irradiating light;
an information acquirer to acquire information regarding a situation inside and outside the vehicle;
a determiner to determine whether information regarding the situation inside and outside the vehicle, acquired by the information acquirer and display start condition match; and
a controller to display, outside the vehicle, information corresponding to the display start condition determined as matching with information regarding a situation inside and outside the vehicle by the determiner by controlling the one or more irradiators;
wherein the determiner determines whether information regarding the situation inside and outside the vehicle, acquired by the information acquirer and display change condition match,
wherein the controller changes a display mode of the information displayed outside the vehicle by controlling the one or more irradiators when the determiner determines that the information regarding the situation outside the vehicle meets the display change condition,
wherein the controller further has in-vehicle notificater notify inside the vehicle of display of information to outside the vehicle and has the in-vehicle notificater continue notification to inside the vehicle until a certain time elapses from an end of display of information to outside the vehicle.

18. The irradiation apparatus according to claim 17, wherein
the in-vehicle notificater is an in-vehicle lamp emitting light to inside the vehicle or an in-vehicle monitor.

19. An irradiation method comprising: acquiring information regarding a situation inside and outside a vehicle; determining whether the information regarding the situation inside and outside the vehicle meets a display start condition; and displaying, outside the vehicle, the information corresponding to the display start condition to meet the information regarding the situation inside and outside the vehicle by controlling one or more irradiators for displaying information outside the vehicle by light irradiation, wherein determining whether the information regarding the situation outside the vehicle meets a display change condition after display of the information outside the vehicle, and the controller changes a display mode of each of pieces of the information displayed outside the vehicle by controlling the one or more irradiators when the determiner determines that the information regarding the situation outside the vehicle meets the display change condition comprising a first out-of-vehicle sensor that is a sensor detecting an object around the vehicle; and a second out-of-vehicle sensor that is a sensor detecting an object around the vehicle and is disposed at a position different from the first out-of-vehicle sensor, obtaining detection information of the first out-of-vehicle sensor and the second out-of-vehicle sensor, and determining at least one of matching between the detection information and the display start condition and matching between the detection information and the display change condition on a basis of detection information of the first out-of-vehicle sensor and detection information of the second out-of-vehicle sensor.

20. An irradiation method, comprising:
acquiring information regarding a situation inside and outside the vehicle;
determining whether information regarding the situation inside and outside the vehicle and display start condition match;
displaying, outside the vehicle, information corresponding to the display start condition determined as matching with information regarding a situation inside and outside the vehicle by the determiner by controlling one or more irradiators; and
notifying inside the vehicle of display of information to outside the vehicle,
determining whether information regarding the situation inside and outside the vehicle and display change condition match,
changing a display mode of the information displayed outside the vehicle by controlling the one or more irradiators when the determiner determines that the information regarding the situation outside the vehicle meets the display change condition,
continuing notification to inside the vehicle until a certain time elapses from an end of display of information to outside the vehicle.

* * * * *